United States Patent
Nakamura

(10) Patent No.: US 8,370,538 B2
(45) Date of Patent: Feb. 5, 2013

(54) COMMUNICATION SYSTEM, INFORMATION PROCESSING APPARATUS, PERIPHERAL APPARATUS, AND METHOD AND MEDIUM THEREFOR

(75) Inventor: Atsushi Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 12/268,952

(22) Filed: Nov. 11, 2008

(65) Prior Publication Data

US 2009/0132731 A1 May 21, 2009

(30) Foreign Application Priority Data

Nov. 14, 2007 (JP) ................................. 2007-296002

(51) Int. Cl.
*G06F 3/00* (2006.01)
*G06F 15/177* (2006.01)

(52) U.S. Cl. .............. 710/19; 710/18; 700/27; 396/203; 715/736

(58) Field of Classification Search ...................... 710/19
See application file for complete search history.

(56) References Cited

U.S. PATENT DOCUMENTS

| | | | | |
|---|---|---|---|---|
| 6,404,447 B1 * | 6/2002 | Kitagawa | ...................... | 715/867 |
| 2002/0018230 A1 * | 2/2002 | Iwadate | ....................... | 358/1.14 |
| 2002/0031361 A1 * | 3/2002 | Shiiya | .............................. | 399/68 |
| 2002/0048039 A1 * | 4/2002 | Nishikawa | .................... | 358/1.15 |
| 2005/0086514 A1 | 4/2005 | Han | | |

FOREIGN PATENT DOCUMENTS

| | | |
|---|---|---|
| JP | 10-234027 A | 9/1998 |
| JP | 10-333846 A | 12/1998 |
| JP | 2002-262010 A | 9/2002 |
| JP | 2006-304338 A | 11/2006 |

\* cited by examiner

*Primary Examiner* — Henry Tsai
*Assistant Examiner* — Dean Phan
(74) *Attorney, Agent, or Firm* — Canon U.S.A., Inc., IP Division

(57) ABSTRACT

A communication system has a peripheral apparatus and a data processing apparatus configured to make a request for processing to the peripheral apparatus. The peripheral apparatus includes a changing unit configured to change state identification information representing a state of the peripheral apparatus by changing a value if the peripheral apparatus is continuously in a predetermined state and not changing the value if the peripheral apparatus is not continuously in the predetermined state. The data processing apparatus receives status information based on the state identification information changed by the changing unit from the peripheral apparatus, and a displaying unit displays the information about the state of the peripheral apparatus for a predetermined display time. The changing unit sets a changing cycle of the state identification information to be shorter than the predetermined display time.

11 Claims, 21 Drawing Sheets

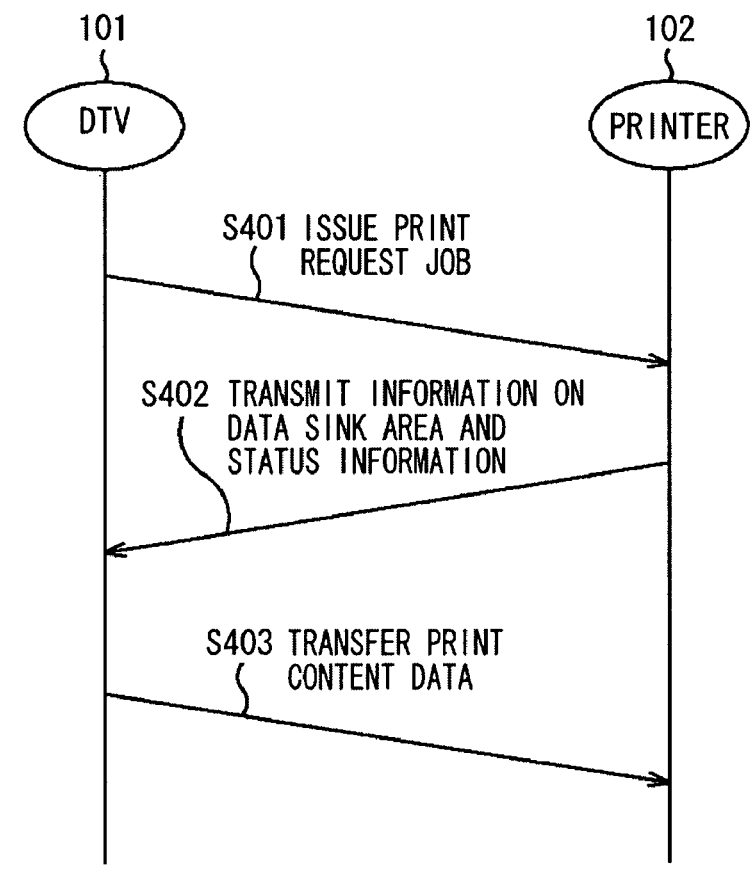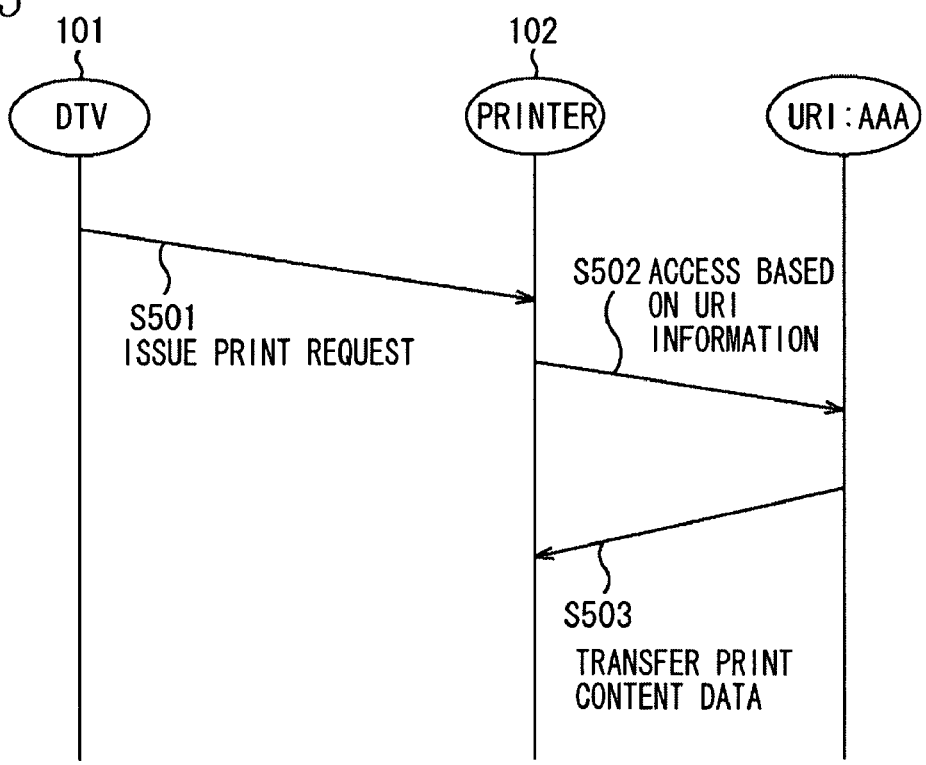

NOTIFY * HTTP/1.1
HOST: 239.255.255.250:1900
CACHE-CONTROL: max-age = 1800
LOCATION: http://192.168.0.100/devdesc.xml
NT: upnp:rootdevice
NTS: ssdp:alive
USN: uuid:sample-device-0001::upnp:rootdevice NOTIFY * HTTP/1.1
HOST: 239.255.255.250:1900
NT: upnp:rootdevice
NTS: ssdp:byebye
USN: uuid:sample-device-0001::upnp:rootdevice

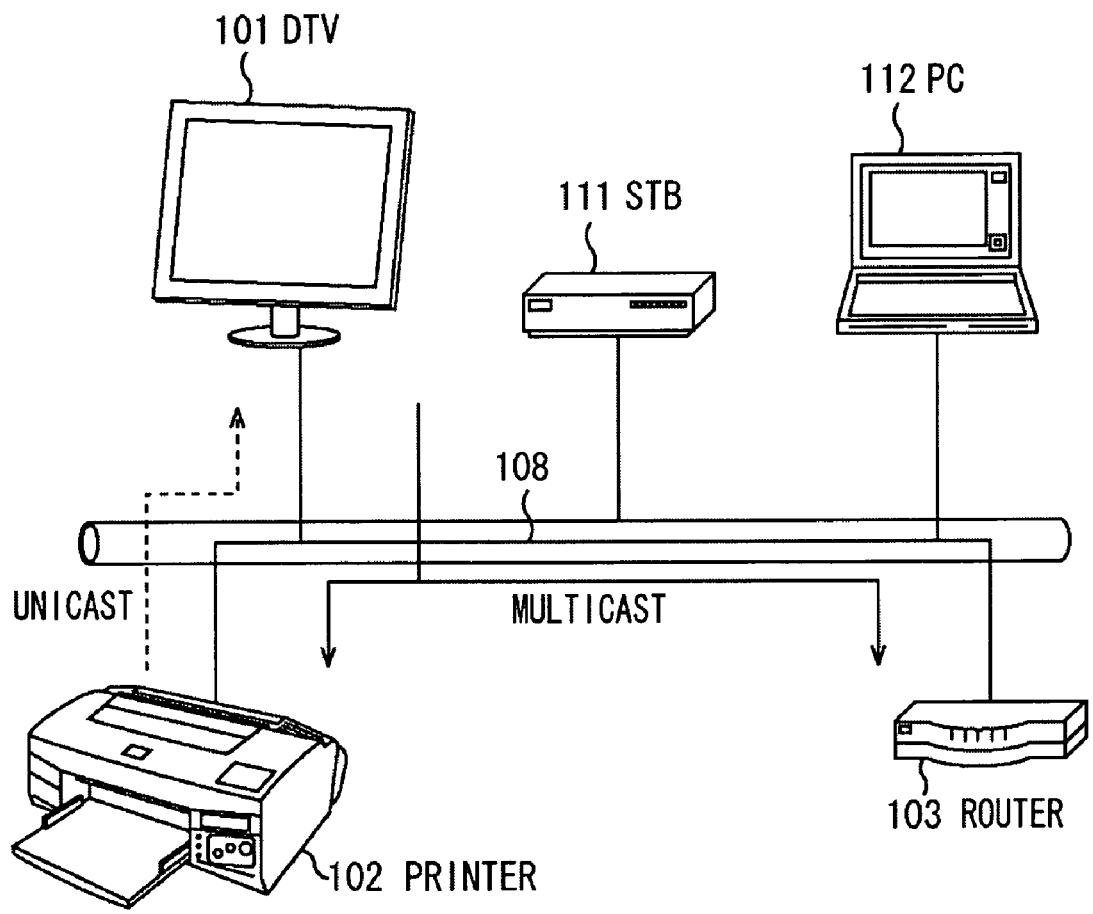

```
HTTP/1.1 200 OK
CACHE-CONTROL: max-age = 1800
DATA: 31 Dec 2004
LOCATION: http://192.168.0.100/devdesc.xml
SERVER: Sample OS/0.1 UPnP/1.0 Sample Product/0.1
ST: urn:schemas-upnp-org:device:Printer:1
USN: uuid: sample-device-0001::upnp:rootdevice
```

FIG. 15

```
GET /devdesc.xml HTTP/1.1
HOST: 192.168.0.100:80
```
1401

FIG. 16

1402
```
HTTP/1.1 200 OK
CONTENT-LENGTH: 1234
CONTENT-TYPE: text/xml

<?xml version="1.0"?>
<root xmlns="urn:scemas-upnp-org:device-1-0">
 <specVersion>
  <major>1</major>
  <minor>0</minor>
 <device>
   ...
```

FIG. 18

```
                                              /-1701
┌─────────────────────────────────────────────────────┐
│ POST /server/control HTTP/1.1                       │
│ HOST: 192.168.0.100:80                              │
│ CONTENT-LENGTH: 1234                                │
│ CONTENT-TYPE: text/xml; charset="utf-8"             │
│ SOAPACTION: "urn:schema-upnp-org:service:PrintBasic:1#CreateJob" │
│                                                     │
│ <s:Envelope                                         │
│   xmlns:s="http://schemas.xmlsoap.org/soap/soapenvelope" │
│   ...                                               │
└─────────────────────────────────────────────────────┘
```

FIG. 19

```
                                              /-1702
┌─────────────────────────────────────────────────────┐
│ HTTP/1.1 200 OK                                     │
│ CONTENT-LENGTH: 321                                 │
│ CONTENT-TYPE: text/xml; charset="utf-8"             │
│ EXT:                                                │
│ SERVER: Sample OS/0.1 UPnP/1.0 Sample Product/0.1   │
│                                                     │
│ <s:Envelope                                         │
│   xmlns:s="http://schemas.xmlsoap.org/soap/soapenvelope" │
│   ...                                               │
└─────────────────────────────────────────────────────┘
```

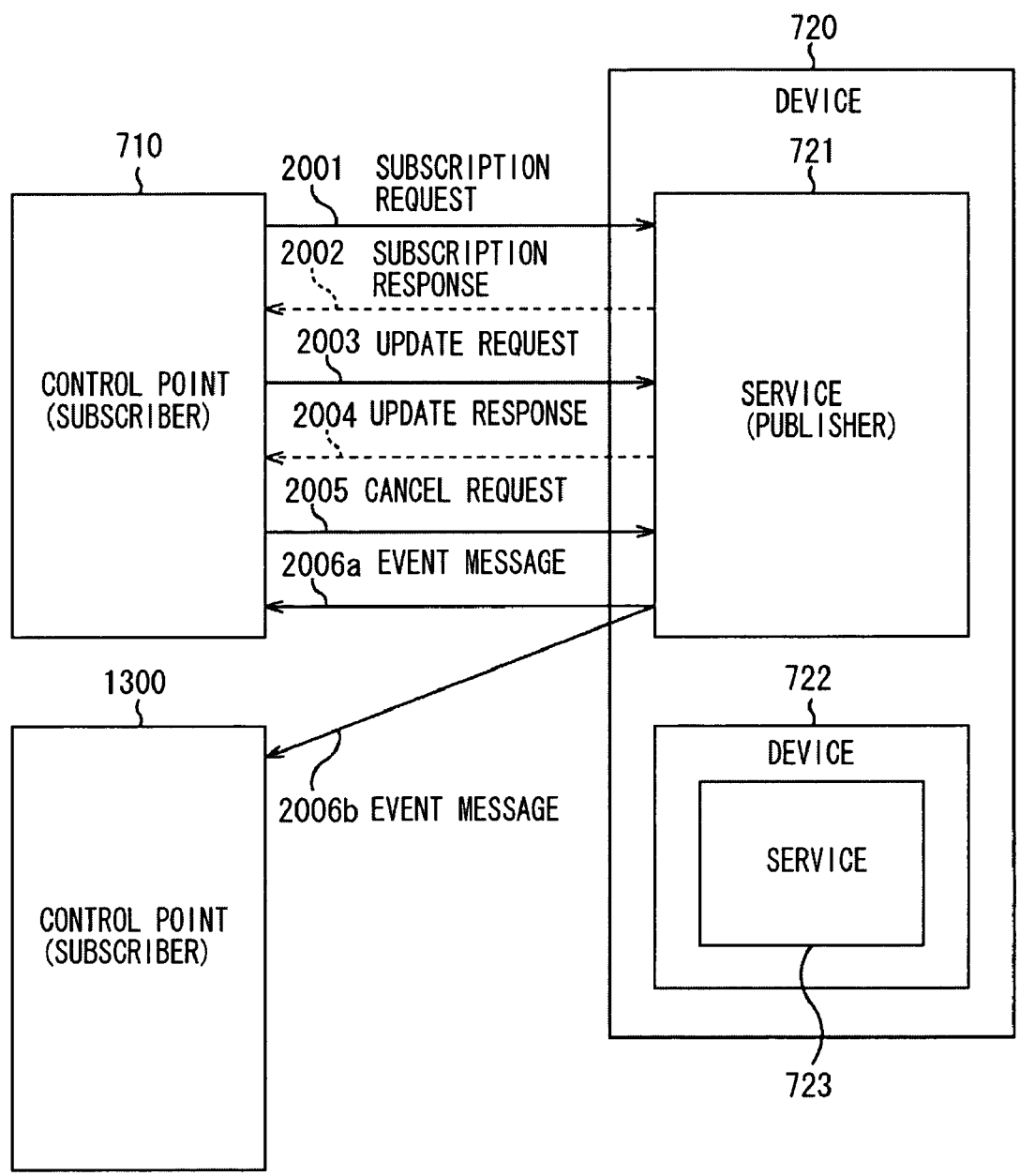

FIG. 21

```
SUBSCRIBE /server/event HTTP/1.1
HOST: 192.168.0.100:80
<SPAN class=gena>CALLBACK: <http://192.168.0.200/
callback>
NT: UPnP:event
TIMEOUT: Second-1800
```
2001

FIG. 22

```
HTTP/1.1 200 OK
SERVER: Sample OS/0.1 UPnP/1.0 Sample Product/0.1
<SPAN class=gena>SID: uuid: sample-subscription-0001
TIMEOUT: Second-1800
```
2002

FIG. 23

```
NOTIFY /callback HTTP/1.1
HOST: 192.168.0.200:80
CONTENT-TYPE: text/xml
CONTENT-LENGTH: 1234
NT: upnp:event
NTS: upnp:propchange
SID: uuid:sample-event-0001
SEQ: 5678

<e: propertyset xmlns:e="urn:schemas-upnp-org:event-1-0">
 <e:property>
  <PrinterState>processing</PrinterState>
 </e:property>
</e:propertyset>
```
2306

FIG29

NOTIFY /upnp/Print-Canon/PrintEnhanced/event/ HTTP/1.1
HOST: 192.168.1.3:3456
CONTENT-TYPE: text/xml; charset="utf-8"
CONTENT-LENGTH: ○○○
<e:propertyset xmlns:e="urn:schemas-upnp-org:event-1-0">
<e:property>
<PrinterState>processing</PrinterState>  ← 1001
<PrinterStateReasons>none</PrinterStateReasons>  ← 1002
</e:property>
</e:propertyset>

FIG30

NOTIFY /upnp/event/ControlPoint HTTP/1.1
HOST: 192.168.1.3:3456
CONTENT-TYPE: text/xml; charset="utf-8"
CONTENT-LENGTH: ○○○
NT: upnp:event
NTS: upnp:propchange
SID: uuid:8f6c9e9e-1dd2-11b2-8468-e7b55d1566ef
SEQ: 9
<e:propertyset xmlns:e="urn:schemas-upnp-org:event-1-0">
<e:property>
<PrinterState>stopped</PrinterStateReasons>
<PrinterStateReasons>media-empty</PrinterStateReasons>
</e:property>
</e:propertyset>
<s:propertyset xmlns:e="urn:schemas-xxxxxxx:event-1-0">
<e:propertyextention>
<PrinterStateDuration>6</PrinterStateDuration>  ← 1101
</e:propertyextention>
</e:propertyset>

COMMUNICATION SYSTEM, INFORMATION PROCESSING APPARATUS, PERIPHERAL APPARATUS, AND METHOD AND MEDIUM THEREFOR

BACKGROUND OF THE INVENTION

1. Field of the Invention

The present invention generally relates to a communication system, a peripheral state display method, and a computer-executable program. More particularly, the present invention relates to a communication system, a peripheral apparatus state display method, and a computer-executable program which are useful for displaying a state of a peripheral apparatus.

2. Description of the Related Art

In recent years, along with the popularization of digital broadcasting and broadband network, digital television (DTV), which allows convenient and easy use of communication service as well as broadcast service, has become prevalent. Further, a technique used for connecting the DTV and digital devices (also referred to as peripheral apparatuses) including a printer, is in widespread public use, and services provided by the DTV in association with the various digital devices are gathering attention. Japanese Patent Application Laid-Open No. 2006-304338 discusses a printing service provided by DTV in association with a printer, which is capable of printing the content received by the DTV according to an instruction from the DTV. Generally, Universal Plug and Play (UPnP) is used as a communication protocol in providing such a service.

Printing processes for printing the content of digital broadcasting is started by having a user select a print instruction button displayed on a screen of the DTV with, for example, a remote control. Then, a print job is issued from the DTV to the printer, and the printer starts printing. Naturally, most of such content is printed while the user is viewing a broadcast program. If, for example, an error such as no paper or low ink level occurs while the printing operation is being executed, the printer can issue a notification message to the DTV in a form of UPnP event notification. This kind of error is generally displayed as an overlay message on the screen of the DTV. Since this type of error message is displayed on the screen displaying the broadcast program, usually, a specification of the DTV is prepared such that the error message is deleted after it is displayed for a predetermined length of time so as not to disturb the user viewing the program.

However, as described above, if the error message is deleted after a predetermined length of time has passed, and the user has not noticed the error message, then the user may not be able to take appropriate action. In that case, the printer may be left in the error state, with the printing either not having been started or not having been completed.

According to network communication protocols, such as UPnP and Web Services on Devices (WSD), which are often used in such a printing system, notification about a status of a device, such as a printer, is mainly given to the DTV in the form of an event notification. The event notification is defined by an established standard, so that it can be issued only when a status of the device is changed. Thus, conventionally, an event notification cannot be issued a plurality of times for a certain error state.

SUMMARY OF THE INVENTION

Aspects of the present invention may help to reduce the likelihood of, and even prevent, a user of a data processing apparatus in a system including the data processing apparatus such as a DTV and a device such as a printer, which are communicably connected to each other, from failing to notice a display regarding a state of the device.

According to an aspect of the present invention, a communication system includes a peripheral apparatus and a data processing apparatus configured to make a request for processing to the peripheral apparatus. The peripheral apparatus includes a changing unit configured to change state identification information representing a state of the peripheral apparatus by changing a value if the peripheral apparatus is continuously in a predetermined state and not changing the value if the peripheral apparatus is not continuously in the predetermined state. The peripheral apparatus also includes a sending unit configured to send status information to the data processing apparatus, if the state identification information is changed by the changing unit, based on the state identification information changed by the changing unit. The data processing apparatus includes a receiving unit configured to receive the status information from the peripheral apparatus and a displaying unit configured to display, if the status information is received by the receiving unit, information about a state of the peripheral apparatus based on the received status information, on a display device for a predetermined display time. The changing unit changes a changing cycle of the state identification information to be shorter than the predetermined display time.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain various principles of the invention.

FIG. 4 is a flow diagram illustrating an example of a procedure for executing a print file method used in data broadcasting printing according to an exemplary embodiment of the present invention.

FIG. 5 is a flow diagram illustrating an example of a procedure for executing a print uniform resource identifier (URI) method used in data broadcasting printing according to an exemplary embodiment of the present invention.

FIG. 11 illustrates an example of flow of information in the printing system when a control point performs a search using UPnP discovery protocol and the device responds according to an exemplary embodiment of the present invention.

FIG. 12 illustrates an example of a search request packet according to an exemplary embodiment of the present invention.

FIG. 15 illustrates an example of a description request according to an exemplary embodiment of the present invention.

FIG. 16 illustrates an example of a description response according to an exemplary embodiment of the present invention.

FIG. 18 illustrates an example of an action request according to an exemplary embodiment of the present invention.

FIG. 19 illustrates an example of an action response according to an exemplary embodiment of the present invention.

FIG. 20 illustrates an example of a flow of information in the printing system when event notification is performed according to an exemplary embodiment of the present invention.

FIG. 21 illustrates an example of a subscription request according to an exemplary embodiment of the present invention.

FIG. 22 illustrates an example of a subscription response according to an exemplary embodiment of the present invention.

FIG. 23 illustrates an example of an event message according to an exemplary embodiment of the present invention.

FIG. 29 illustrates an example of a portion defined by UPnP printing specification taken from UPnP event data which is issued when printer status information is changed from "idle" to "printing" according to an exemplary embodiment of the present invention.

FIG. 30 illustrates an example of event data when the state of the printer is changed from a printing state to an error state according to an exemplary embodiment of the present invention.

DETAILED DESCRIPTION OF THE EMBODIMENTS

Various exemplary embodiments, features, and aspects of the invention will be described in detail below with reference to the drawings.

According to a first exemplary embodiment, a printing system including a DTV and a DTV printer (hereinafter referred to as a "printer") are described. The DTV according to the present exemplary embodiment is a printer capable of communication using the UPnP protocol. The DTV has a print instruction function for instructing the printer to make a print of the content which the DTV has received, by sending the content to the printer using the UPnP protocol. The printer prints the content sent from the DTV using the UPnP protocol. The present exemplary embodiment includes a method for notifying the DTV of a problem that has been detected in the printer in such a printing system. The method for notifying the DTV when a problem has occurred in the printer will be described below in detail. It is to be noted that a protocol, a version, an address, and a numerical value as described below are exemplary and shall not be construed as limiting the present invention unless otherwise specified.

Figure 1:
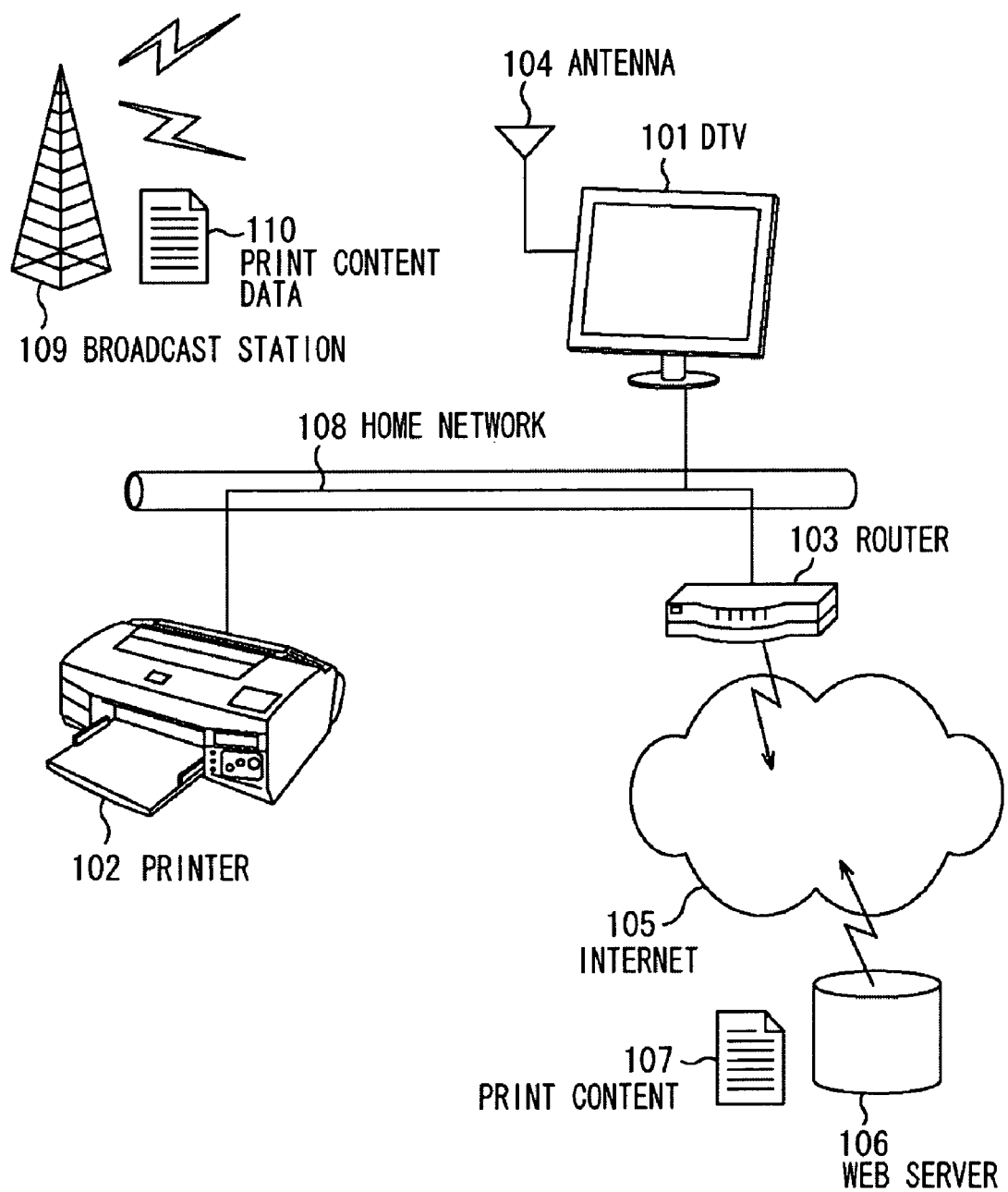
FIG. 1 illustrates an example of a configuration of a printing system according to an exemplary embodiment of the present invention.

FIG. 1 illustrates an example of a configuration of a printing system (i.e., a communication system) according to an exemplary embodiment of the present invention. In FIG. 1, the printing system includes a DTV 101, a printer 102, a router 103, an antenna 104, and a home network 108. The DTV 101 and the printer 102 are communicably connected to each other via the home network 108. The home network 108 can connect to the Internet 105 via the router 103. In other words, the DTV 101 and the printer 102 are capable of accessing a web server 106 via the Internet 105. Further, the printer 102 is capable of obtaining print content 107 stored in the web server 106.

The DTV 101 is capable of receiving digital broadcasting transmitted from a broadcast station 109 via the antenna 104. Further, the DTV 101 is capable of obtaining print content data 110 which is transmitted by using data broadcasting of the digital broadcasting. Further, the DTV 101 is capable of transmitting the print content data 110 to the printer 102 via the home network 108.

Figure 2:
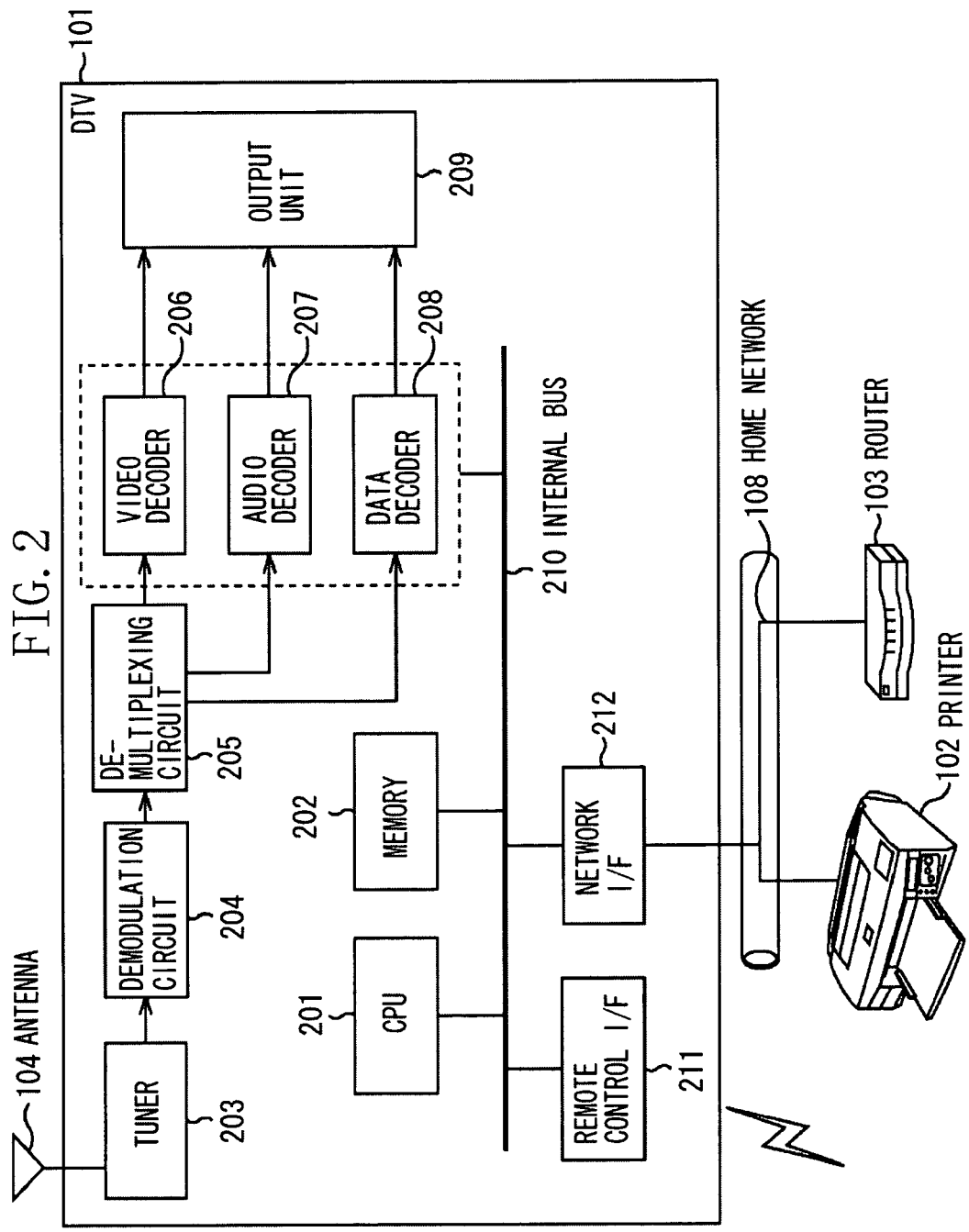
FIG. 2 illustrates an example of an internal configuration of a DTV according to an exemplary embodiment of the present invention.

FIG. 2 illustrates an example of an internal configuration of the DTV 101. The DTV 101 includes a central processing unit (CPU) 201 that controls the DTV 101. A memory 202 is used for storing and running a control program. The CPU 201 and the memory 202 are communicably connected to a remote control I/F 211 and a network I/F 212 via an internal bus 210.

In this embodiment, the remote control I/F 211 is an interface used for communication between the DTV 101 and a remote control apparatus (not shown). The network I/F 212 is used for communication between the DTV 101 and the printer 102 or the router 103 via the home network 108. A program used for controlling the network I/F 212 is stored in the memory 202. This program includes a communication control program based on UPnP protocol, which is a network communication protocol used for communication with an external device.

According to this embodiment, a broadcast wave received by the antenna 104 is input to a tuner 203. The tuner 203 selectively outputs a broadcast wave having a frequency specified by a user using the remote control apparatus to a demodulation circuit 204. The demodulation circuit 204 demodulates the input broadcast wave into MPEG-2 Transport Stream (MPEG-2 TS). MPEG-2 TS is a data stream with video, audio, and data encoded and multiplexed. A demultiplexing circuit 205 demultiplexes the MPEG-2 TS into packetized encoded data such as video Packetized Elementary Stream (PES) or audio PES. Further, section data such as Service Information (SI) used for generating caption data, Electronic Program Guide (EPG) and so forth included in the MPEG-2 TS, is also demultiplexed by the demultiplexing circuit 205.

The PES and the section data demultiplexed at the demultiplexing circuit 205 are respectively input to a decoding unit (area shown by broken lines in FIG. 2). The decoding unit includes a video decoder 206 used for decoding a video PES into a video signal, an audio decoder 207 used for decoding an audio PES into an audio signal, and a data decoder 208 used for decoding section data.

The video signal and the audio signal decoded by the decoding unit are subjected to image processing and audio processing, respectively, and are output to an output unit 209 such as a monitor, a speaker, or the like. Further, the decoded data is stored in the memory 202, managed, and output to the output unit 209 according to a predetermined operation by the user. For example, if the user makes an operation to display closed caption, then the closed caption data is superposed over the video data and output to the monitor. Further, if the user makes an operation to display data broadcasting, the data broadcasting content decoded by the data decoder 208 is parsed using a predetermined application stored in the memory 202 and displayed on the screen of the output unit 209 as a data broadcasting image.

Figure 3:
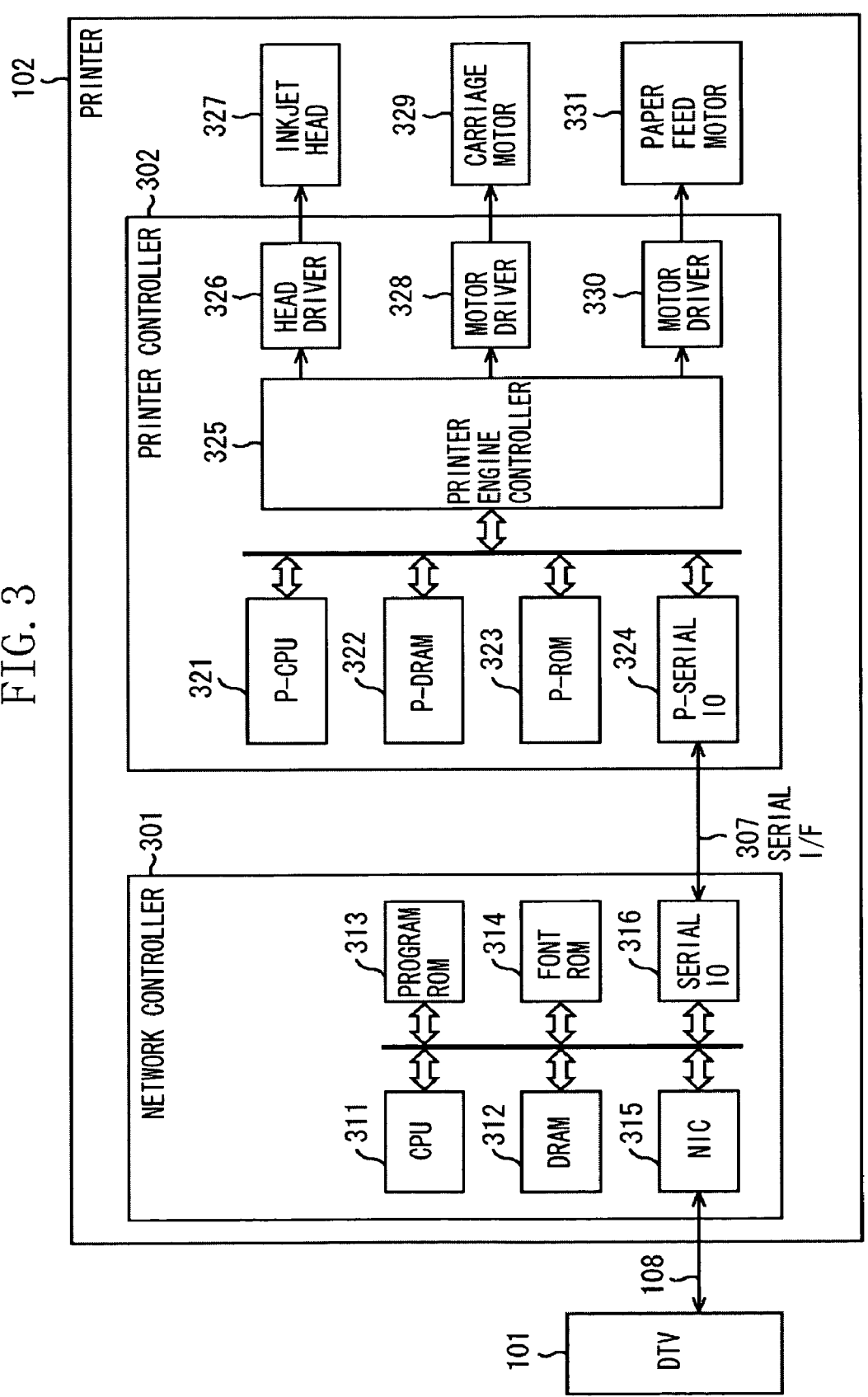
FIG. 3 illustrates an example of an internal configuration of a printer according to an exemplary embodiment of the present invention.

Next, an example of a configuration of the printer 102 will be described. FIG. 3 illustrates an example of an internal configuration of the printer 102. The configuration of the printer 102 connected to the DTV 101 via the home network 108 may be generally classified into a network controller 301 and a printer controller 302.

First, an example of a configuration of the network controller 301 will be described. The network controller 301 includes a CPU 311 configured to control the network controller 301 and a dynamic random access memory (DRAM) 312 used as a buffer memory for temporarily storing received data, and also used as a work memory. Further, the network controller 301 includes a network interface card (NIC) 315, which is a network interface controller used for communication with a device connected to the home network 108. Furthermore, the network controller 301 includes a program read only memory (ROM) 313 in which a program executed by the CPU 311 is stored and a font ROM 314 in which font data is stored.

A program for communication control that is based on the transmission control protocol/internet protocol (TCPIP), Universal Plug and Play (UPnP), and related protocols is stored in the program ROM 313. TCPIP is one of the network communication protocols used for communication with an external device and UPnP is one of the upper communication protocols of the network communication protocols. The network controller 301 includes a serial IO 316, which is used for communication with the printer controller 302 described below. Each of the functional blocks is communicably connected via an internal bus of the network controller 301.

Next, an example of a configuration of the printer controller 302 will be described. The printer controller 302 includes a P-CPU 321 which is a CPU for the printer controller. Further, the printer controller 302 includes a P-DRAM 322 which is used as a buffer memory for temporarily storing received data, and also used as a work memory. Furthermore, the printer controller 302 includes a P-ROM 323 where a program executed by the P-CPU 321 is stored, a P-serial input/output (IO) 324, and a printer engine controller 325.

The P-serial IO 324 is a serial IO on the side of the printer controller 302 used for communication with the network controller 301. These blocks are communicably connected to the printer engine controller 325 via an internal bus.

The printer engine controller 325 is a controller used to control various types of drivers and motors used for driving the printer 102. A head driver 326 configured to drive an ink jet head 327 is controlled by the printer engine controller 325. A motor driver 328 configured to drive a carriage motor 329 used for moving a head, and a motor driver 330 configured to drive a paper feed motor 331 to convey paper, are controlled by the printer engine controller 325.

Regarding data broadcast printing as standardized by Association of Radio Industries and Businesses (ARIB), which is a DTV broadcasting standardization organization, the print content may be structured document data for printing that is described in markup language format. Thus, printing data is generated by the printer 102. The network controller 301 of the printer 102, which has acquired the transmitted print content data, stores the content data in the DRAM 312. Then, the network controller 301 parses a XHTML-Print file or Cascading Style Sheets Print Profile (CSSPP) file, which is structured document data included in the print content data. After parsing these files, the network controller 301 performs rendering processing to generate printing image data.

The printing image data generated by the network controller 301 is transmitted to the printer controller 302 via the serial IO 316 and a serial I/F 307. The printer controller 302 drives the printer 102 under control of the printer engine controller 325 to print the printing image data transmitted to the printer controller 302.

In data broadcasting printing, there are mainly two methods in obtaining print content: one is a print file method and the other is a print URI method.

FIG. 4 is a diagram illustrating an example of a procedure for executing the print file method used in the data broadcasting printing. In FIG. 4, time proceeds from the top to the bottom of the figure. In step S401, the DTV 101, which has obtained actual print content data from the data broadcasting data, issues (sends) a print request job to the printer 102 when preparation for printing is made.

The printer 102 that has received the print request job determines whether the print content data can be accepted. If the printer 102 determines that the print content can be accepted, the printer 102 sets a data sink area used in receiving the print content data. In step S402, the printer 102 returns status information informing that printing is possible together with information about the data sink area to the DTV 101.

In step S403, the DTV 101 which received information that printing is possible, transmits the print content to the printer 102. Transmission of the print content data is performed by HTTP POST processing. The printer 102 stores the received print content data in the data sink area and starts the printing process of the print content data. Details of the printing process will be described below.

FIG. 5 is a diagram illustrating an example of a procedure for executing the print URI method used in the data broadcast printing. According to the print URI method, the DTV 101 obtains address information indicating a destination to save the print content data from the data broadcasting data using Uniform Resource Identifier (URI) instead of obtaining actual print content data.

In step S501, when preparation for printing is made, the DTV 101, which has obtained the address information (URI information), issues (sends) a print request job to the printer 102. The printer 102 which has received the print request job determines whether the printer 102 is in a printable state. If the printer 102 is in a printable state, then in step S502, the printer 102 accesses a location indicated by the URI. The location is included in the address information (URI information) and corresponds to "AAA" in FIG. 5. Next, in step S503, the printer 102 obtains actual print content data (e.g., structured document data and ancillary monomedia data). The print content data is obtained by an HTTP GET request. Upon obtaining the actual print content data, the printer 102 starts the printing process.

A processing unit of the UPnP protocol is in a network protocol stack of the DTV 101 and the printer 102. In addition to a printer discovery function that is operated when power is turned on using UPnP device discovery function, the DTV 101 also includes functions such as an issue function and a communication function. The issue function is used for issuing a print request job according to UPnP procedures. The communication function according to the UPnP protocols is used for controlling the printer 102 when it obtains a status according to an event.

In one version, the printer 102 may function to notify another UPnP device that it is participating in the network when the printer 102 is connected to the network. Further, the printer 102 may function to receive a print request job issued from a control point that is a print client of, for example, the DTV 101. Furthermore, the printer 102 may have a response function for responding to an inquiry about device information, and a UPnP communication function used for issuing printing status to the control point using the event function when the status is changed, for example, by an error or when printing is finished.

The UPnP, which is one example of a communication protocol used for communication between the DTV 101 and the printer 102, will now be described. A communication network supported by UPnP (hereinafter referred to as the "UPnP network") is a peer-to-peer network. The use of the UPnP network may eliminate the need for a complicated setting of an IP address or an installation of a device driver, which has otherwise, in many cases, conventionally been required in the connection of an apparatus to a network. Here, a rough outline of a basic configuration of the UPnP network, protocol, and execution steps will be described. Further details will be provided in documents of each standard.

Components of the basic configuration of the UPnP network are "device", "service", and "control point". The "device" is a UPnP-compliant device including, for example, a printer or a broadband router (Internet Gateway Device). The "service" is the smallest unit representing a function provided by the device. For example, if the device is a printer defined by the UPnP Forum, then PrintBasic service can be provided by the device. The "control point" is a device that controls and uses the service provided by the device. A personal computer (PC), a set-top box (STB), and a DTV are included in the control point. The device provides at least one service. Further, the device can include an embedded device. A base device is called a root device.

Figure 6:
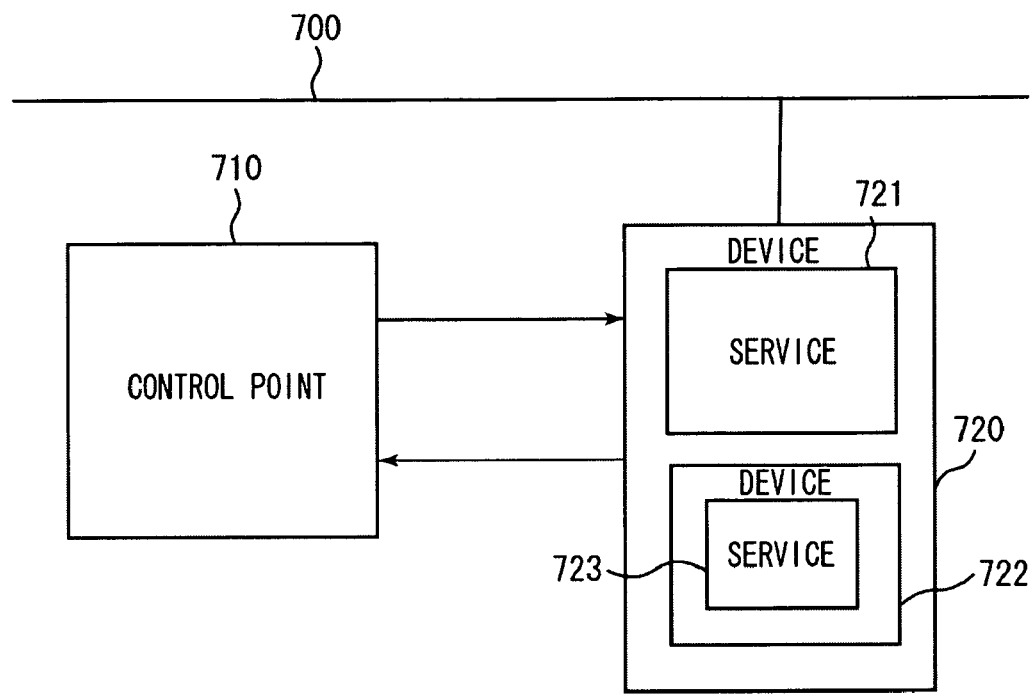
FIG. 6 illustrates an example of a basic configuration of a UPnP network according to an exemplary embodiment of the present invention.

FIG. 6 illustrates an example of a basic configuration of the UPnP network. In FIG. 6, a control point 710 and a device 720 are connected to a network 700. The device 720 includes a service 721 and an embedded device 722. The embedded device 722 further includes a service 723.

The UPnP network is based on TCP/IP and allows distribution of a message using Hypertext Transfer Protocol (HTTP) and Extensible Markup Language (XML). A UPnP device (e.g., the control point 710, the device 720) can use TCP/IP stack protocols such as Transmission Control Protocol (TCP), User Datagram Protocol (UDP), Internet Group Management Protocol (IGMP), and Address Resolution Protocol (ARP), and can also use TCP/IP services associated with Dynamic Host Configuration Protocol (DHCP) and Domain Name System (DNS). Since the UPnP network is based on TCP/IP, the UPnP network is independent of a physical medium on the network.

Figure 7:
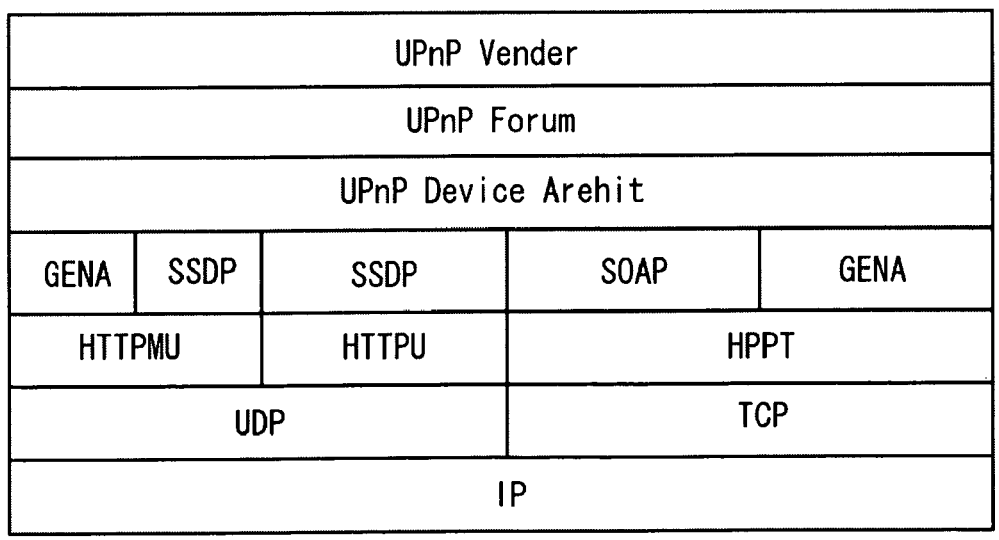
FIG. 7 illustrates an example of a basic configuration of a UPnP protocol stack according to an exemplary embodiment of the present invention.

FIG. 7 illustrates an example of a UPnP protocol stack. HTTPU and HTTPMU are extensions of HTTP using UDP. Basic message structure used in the UPnP protocol is HTTP. HTTPU is used in unicast communication whereas HTTPMU is used in multicast communication.

Simple Service Discovery Protocol (SSDP) is a protocol that defines a method used in discovering a network service. SSDP, which is based on HTTPU and HTTPMU, defines a method used in discovering a service which the control point is interested in and a method used by the device in announcing the service.

Generic Event Notification Architecture (GENA) is an architecture that transmits notifications using HTTP and HTTPMU. In order to make an event possible, GENA defines a type of a subscriber of notification or a publisher. Simple Object Access Protocol (SOAP) defines specifications of XML and HTTP used for executing Remote Procedure Call (RPC). The control point controls the device using SOAP.

A message concerning unique information of a vendor is set in the topmost layer of the protocol stack. A message that is complemented according to information defined by the working committee (WC) of the UPnP forum is set in the layer below the topmost layer. A message in the upper layer is distributed using IP in a form of HTTP message according to a protocol used in UPnP architecture such as SSDP or GENA.

Next, the steps of UPnP networking will be described. Operation of UPnP networking may be executed in six steps: addressing, discovery, description, control, eventing, and presentation. Each step will be described below.

<Addressing>

In this step, assignment of an IP address is performed so that communication by TCP/IP, which is the basis of the UPnP network, becomes possible. The UPnP device may use a Dynamic Host Configuration Protocol (DHCP) client. When the device is first connected to the network, the device searches for a DHCP server to obtain an address. If the device is unable to find the DHCP server, then the device obtains an address using Auto-IP. Auto-IP randomly generates the address within the link-local address range (169.254/16 for IP Version 4) assigned by the Internet Assigned Numbers Authority (IANA). Then, Auto-IP confirms that the address generated is not already used, utilizing Address Resolution Protocol (ARP) and announces that the address will be used. If the device obtains an IP address using Auto-IP, the device searches for the DHCP server at regular intervals and retrieves an address from the DHCP server when the DHCP server is found.

<Discovery>

The next step after the assignment of the IP address is discovery. When the device is added to the network, UPnP discovery protocol allows the device to announce that the embedded service of the device has become available on the network. Similarly, when a control point is added to the network, the control point may search for available devices.

Figures 8, 9, 10:
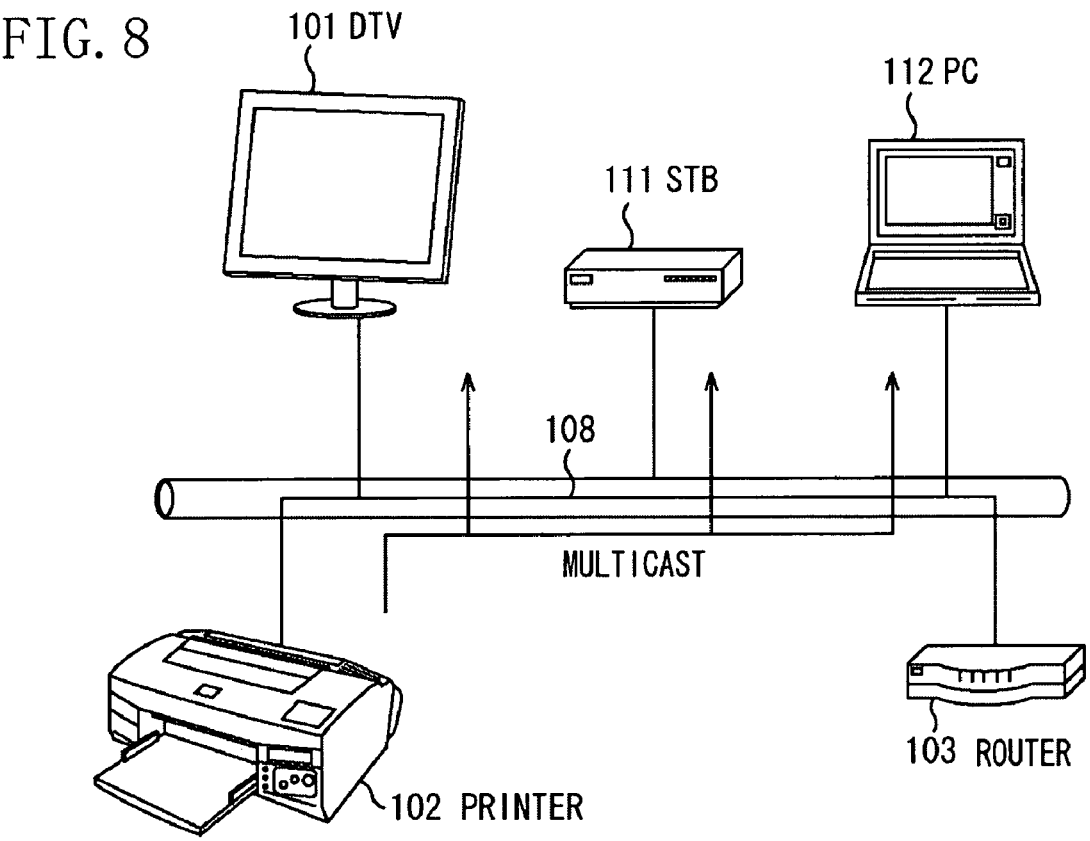
FIG. 8 illustrates an example of flow of information when the device makes an announcement using UPnP discovery protocol in the printing system according to an exemplary embodiment of the present invention.
FIG. 9 illustrates an example of an announcement packet indicating that the device is added to the network and can be used according to an exemplary embodiment of the present invention.
FIG. 10 illustrates an example of an announcement packet indicating that the device is being removed from the network and thus cannot be used according to an exemplary embodiment of the present invention.

FIG. 8 illustrates an example of flow of information when the device makes an announcement using the UPnP discovery protocol in the printing system. In order to make an announcement, the printer 102 (i.e., the device) sends a UDP multicast packet to a multicast address (port 239.255.255.250:1900) that is assigned for SSDP by IANA. In FIG. 8, the printer 102 makes announcement to the DTV 101, a STB 111, and a PC 112, which are the control points.

FIG. 9 illustrates an example of the announcement packet indicating that a device is added to the network and can be used. The announcement packet is sent over the network using HTTPMU. A NOTIFY method of GENA is used for the request in the announcement packet. Further, NTS header is "ssdp:alive". Headers of the packet further include an effective period of announcement, device description URL, an announcement type, and a proper name of service. Further, body of the message in this example is not present but blank.

FIG. 10 illustrates an example of the announcement packet indicating that the device is being removed from the network and thus cannot be used. The NOTIFY method of GENA is used for the request in the announcement packet. The NTS header is "ssdp:byebye".

FIG. 11 illustrates an example of flow of information in the printing system when the control point searches for an available device using the UPnP discovery protocol and a device responds to the request. The DTV 101, which is an example of the control point, searches for the device by sending a UDP multicast packet (search request packet) to the multicast address (port 239.255.255.250:1900), which is as signed for SSDP by IANA. The printer 102, which is an example of the device that receives the UDP multicast packet, responds to the request by sending a search response packet to the control point using UDP unicast.

FIG. 12 illustrates an example of a search request packet. The search request packet is sent over the network using HTTPMU. M-SEARCH method is used for the request in the search request packet. Further, the MAN header is "ssdp: discover". ST header indicates the search target. The body of the message in this example is not present but blank.

Figures 13, 14:
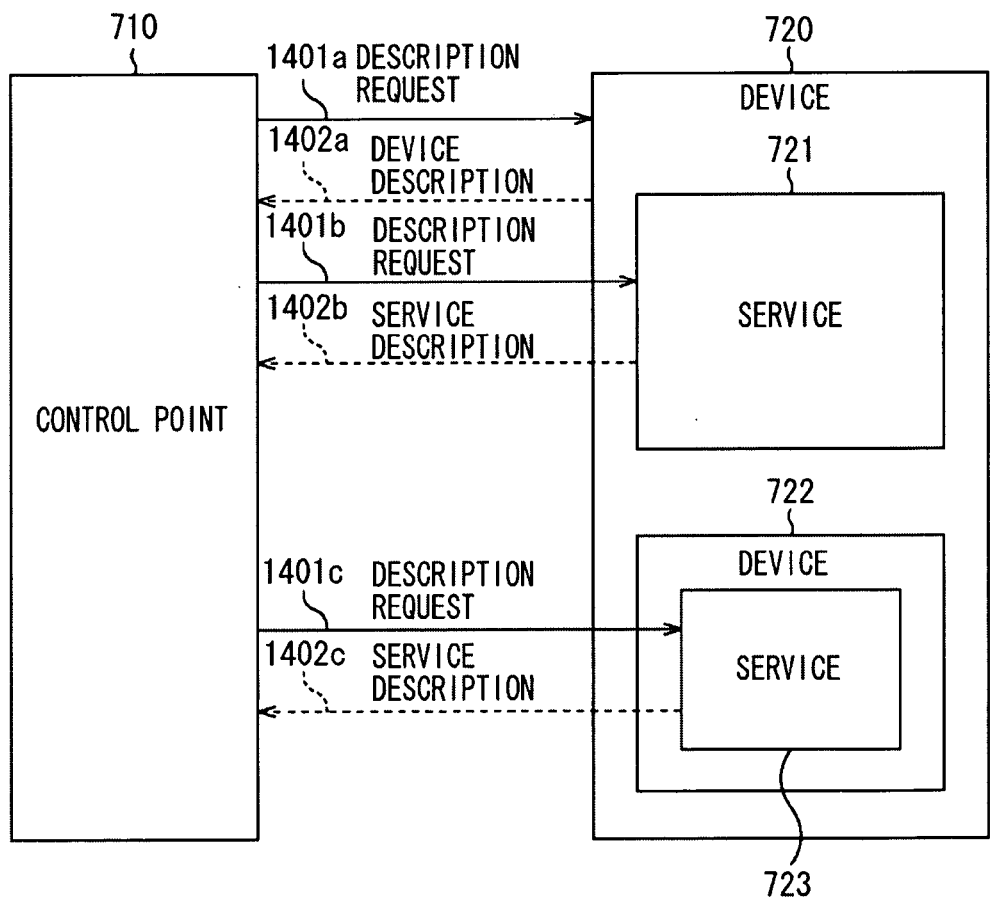
FIG. 13 illustrates an example of a search response packet according to an exemplary embodiment of the present invention.
FIG. 14 illustrates an example of flow of information when a description is performed in the printing system according to an exemplary embodiment of the present invention.

FIG. 13 illustrates an example of a search response packet. The search response packet is sent over the network using HTTPU. The search response packet includes an effective period of announcement, device description URL, a search target, and a proper name of an announcement service.

<Description>

"Description" is a second step of the UPnP networking and is performed after the control point has discovered the device according to "discovery". Other steps (i.e., "control", "eventing", and "presentation") can be performed after this step (description).

FIG. 14 illustrates an example of flow of information when description is performed in the printing system. On acquiring the device description URL of the device 720 according to discovery, the control point 710 sends a description request 1401 to the device 720. In response to the description request 1401, the device 720 sends a description response 1402 including the description to the control point 710.

FIG. 15 illustrates an example of the description request 1401. The description request 1401 is sent over the network using a HTTP GET method.

FIG. 16 illustrates an example of the description response 1402. The body of the HTTP message is described using XML. There are two types of descriptions in UPnP: one is device description and the other is service description.

The device description includes a list of services supported by the device 720. URLs such as service description URL, control URL, and eventing URL of each service are included in the list. Further, if the device 720 has the embedded device 722, a device list is also included in the device description.

The service description includes an action list used for controlling the services 721 and 723 as well as a service status table indicating a state of the service. The action list includes "name, argument, related state variable, and input/output direction" of each action. The service state table includes "name, type, range, and event characteristic" of each state variable.

First, the control point 710 retrieves the device description (the description response 1402a). Then, by issuing an HTTP GET request to each service description URL included in the device description, the control point 710 retrieves each service description (description responses 1402b and 1402c). After retrieving the service description, the control point 710 becomes capable of controlling and displaying the services 721 and 723 of the device 720.

<Control>

In the control step, the control point sends a request for the services provided by the device and controls the device.

Figure 17:
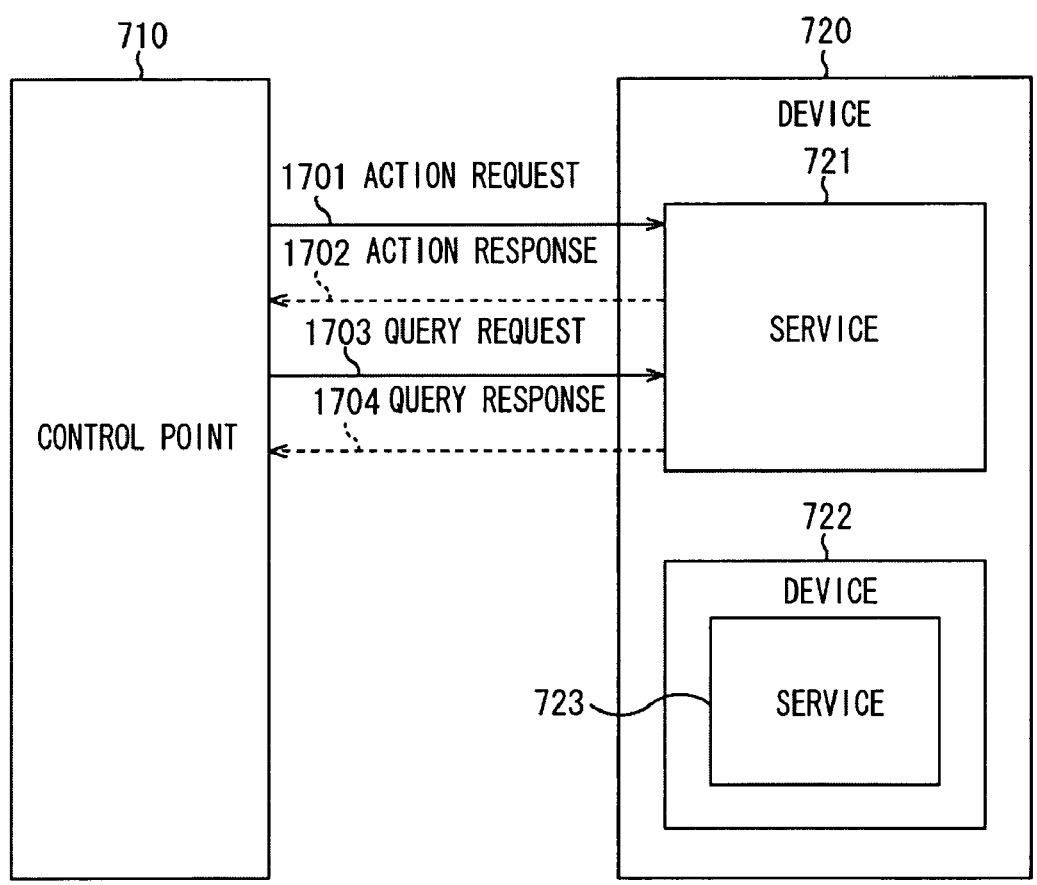
FIG. 17 illustrates an example of flow of information when a control point controls the device in the printing system according to an exemplary embodiment of the present invention.

FIG. 17 illustrates an example of a flow of information when the control point controls the device in the printing system. Since the control point 710 has retrieved the device description and the service description in the description step, the control point 710 can control the device 720. The control point 710 can execute the action (send an action request 1701) and retrieve the result (receive an action response 1702). Further, the control point 710 can also query the device's service for state variables (send a query request 1703) and receive a current value of state variables (receive a query response 1704).

SOAP may be used in controlling the UPnP network. SOAP defines usage of XML/HTML in realizing a remote procedure call. A control message is formatted based on a SOAP header and body element and distributed over the network via HTTP. The control point 710 sends the action request 1701 to a control URL included in the device description of the device 720 using HTTP POST or M-POST method.

FIG. 18 illustrates an example of an action request 1701. In FIG. 18, POST method is used in the request line. CONTENT-TYPE is in text/xml and is charset="utf-8". An action name is included in SOAPACTION. The message body is described in XML and includes Envelope element defined by SOAP. Subelements such as action and argument are included in a subelement Body of the Envelope element.

FIG. 19 illustrates an example of an action response 1702. The example in FIG. 19 illustrates a case where the action is successfully accepted. The response line includes a code indicating that the action has been successfully accepted via HTTP. The message body is described using XML and includes SOAP Envelope elements. An action response subelement is included in the subelement body of the message body. If the action includes an output argument, the action response 1702 includes the argument as a subelement.

<Eventing>

In the eventing step, the control point registers a notification request for a change of state variables in the device and receives notification if the state variables are changed. A source of the event or the device's service is referred to as a publisher, and a destination of the event or the control point is referred to as a subscriber. A subscriber sends a message in requesting event notification (referred to as subscription).

FIG. 20 illustrates an example of a flow of information in the printing system when eventing is performed.

The control point 710 sends a request for eventing (subscription request 2001) via HTTP to an eventing URL retrieved by the "device description of the device 720". Then, the control point 710 receives a response to the eventing (subscription response 2002) via HTTP. The subscription request 2001 includes three types of messages: subscription request used for registration of event notification, renew request used for renewal of registration before the subscription expires, and cancel request used for canceling the subscription before the subscription expires.

FIG. 21 illustrates an example of the subscription request 2001. In FIG. 21, the request line is described using GENA SUBSCRIBE method. Headers include destination URL of the event message and notification type (UPnP:event). The body of the message in this example is not present but blank.

FIG. 22 illustrates an example of the subscription response 2002. The example in FIG. 22 illustrates a case where the subscription is successfully accepted. The response line includes a code indicating that the subscription has been successfully accepted via HTTP. Headers include an ID used for identifying the subscription and duration of the subscription.

An update request 2003 for an existing subscription is issued using a GENA SUBSCRIBE method. A subscription ID is included in a header of the update request 2003. An update response 2004 is issued in response to the update request 2003. A cancel request 2005 is issued using GENA UNSUBSCRIBE method. A subscription ID is included in a header of the cancel request 2005.

The service 721 (publisher) of the device 720 sends event messages 2006a and 2006b to the control point 710 and a control point 1300 according to a request via HTTP to a destination URL of the event message included in the subscription request 2001. The control points 710 and 1300, which are the subscribers that received the event messages 2006a and 2006b, return a response to the service 721 (publisher) of the device 720 via HTTP.

FIG. 23 illustrates an event message 2306 that is an example of the event messages 2006a and 2006b. "NOTIFY" method is used in the request line. The headers include CONTENT-TYPE (text/xml), NT (upnp:event), NTS (upnp:propchange), and SID (uuid:<subscription ID>). The message body in this example may be described in XML. A suitable number of property subelements having state variables as a subelement is included in the propertyset element.
<Presentation>

Figure 24:
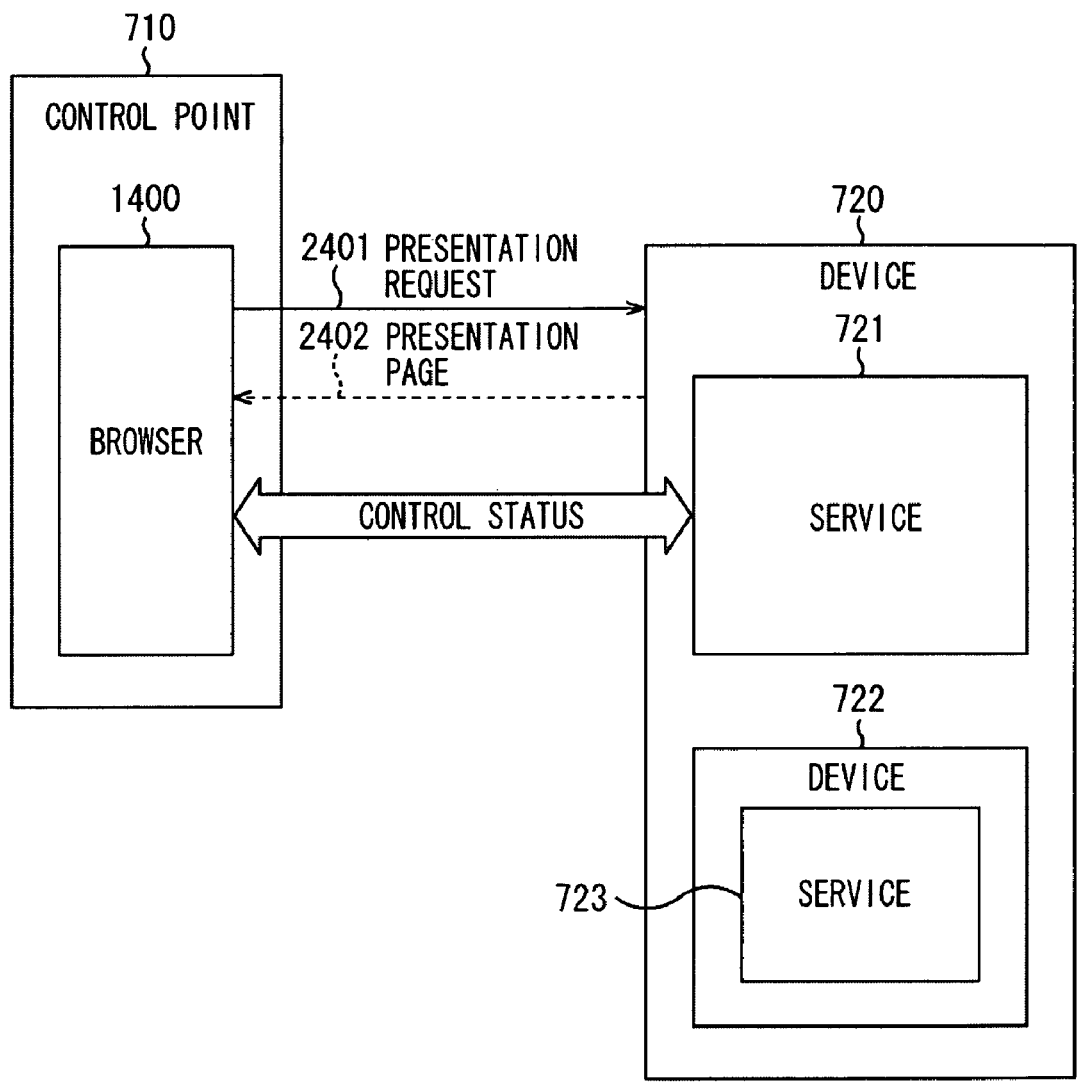
FIG. 24 illustrates an example of a flow of information when a browser obtains access to a presentation page of the device in the printing system according to an exemplary embodiment of the present invention.

In the presentation step, a web service, which can be provided by the device, can be viewed by a browser. Accordingly, control of the device or display of the service using a web page can be performed. FIG. 24 illustrates an example of a flow of information when a browser obtains access to a presentation page of the device in the printing system.

On retrieving a presentation URL included in the device description of the device 720, the control point 710 becomes capable of displaying a presentation page of the device 720 via a browser 1400. The browser 1400 sends a presentation request 2401 to the presentation URL of the device 720 and retrieves a presentation page 2402 using a HTTP GET method. The device 720 is capable of providing the control point 710 with a control unit and a state display unit of the service 721 via the representation page. The above-described steps illustrate an example of an outline of the UPnP networking.

Figure 25:
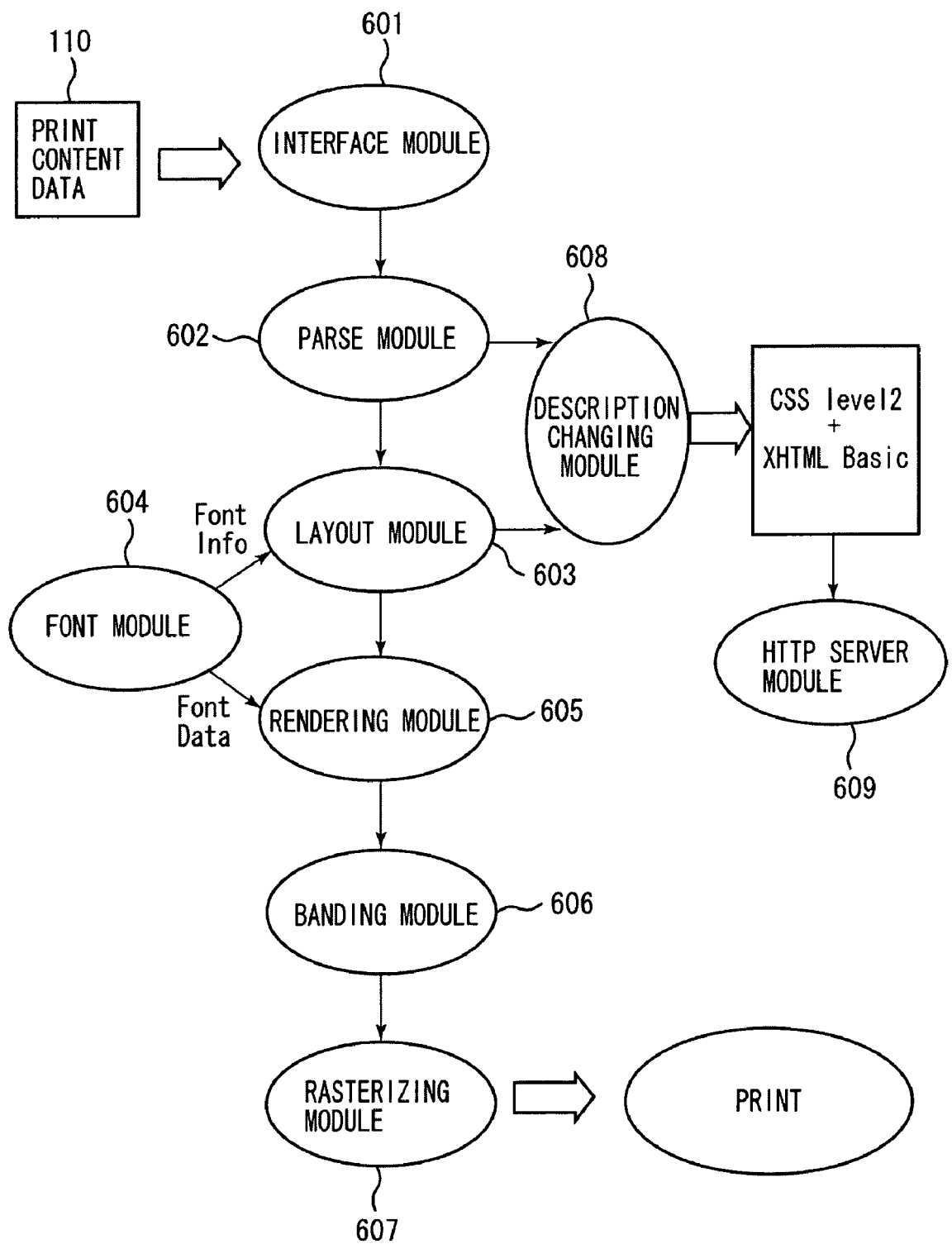
FIG. 25 illustrates an example of a software module configuration of a network controller in the printer according to an exemplary embodiment of the present invention.

Next, printing and status notification processing will be described in detail. FIG. 25 illustrates an example of a software module configuration of the network controller 301 in the printer 102.

When an interface module 601 receives CreateJobV2 or CreateURLJob, which is a UPnP print request command, from the DTV 101 (i.e., a print control point), the printer 102 starts the printing process. If the print request command is CreateJobV2, then the interface module 601 captures the print content data 110 which is sent by HTTP POST method. In another version, if the print request command is CreateURLJob, then the interface module 601 obtains print content data 620 using HTTP GET method based on URI information associated with the print request command.

The interface module 601 sends the received print content data 110 to a parse module 602. The interface module 601 also has a function to obtain an internal state (status) of the printer 102 from the printer controller 302 and send printer status information, which is information about the obtained status, by a function of UPnP eventing to the DTV 101. Further, the interface module 601 has a function to send a command sent from the DTV 101 or the network controller 301 to the printer controller 302.

Further, the interface module 601 can directly receive the print content data 110 sent from the DTV 101 according to the above-described print file method. Additionally, the interface module 601 can obtain URI which indicates location of the print content data 110 from the DTV 101 according to the above-described print URI method, and obtain actual data of the print content data 110 according to the URI.

The parse module 602 parses XHTML-Print file or CSSPP file, which is structured document data included in the print content data 110, after storing the actual data of the print content data 110 in the DRAM 312.

A layout module 603 generates an image layout based on the print content data 110 using font information obtained from a font module 604. Then, a rendering module 605 generates printing image data using font data obtained from the font module 604. The printing image data is print out by processing of a banding module 606 and a rasterizing module 607. At this time, the printing image data generated by the network controller 301 is transmitted to the printer controller 302 via the serial IO 316. The printer controller 302 drives the printer 102, according to a control by the printer engine controller 325, to output and print the printing image data that has been transmitted.

Further, a description changing module 608 changes description of the print content data 110 based on a processing result of the parse module 602 and the layout module 603, and outputs the changed description to an HTTP server module 609. The HTTP server module 609 outputs the description-changed print content data 110 to an HTTP server (not shown).

Figure 26:
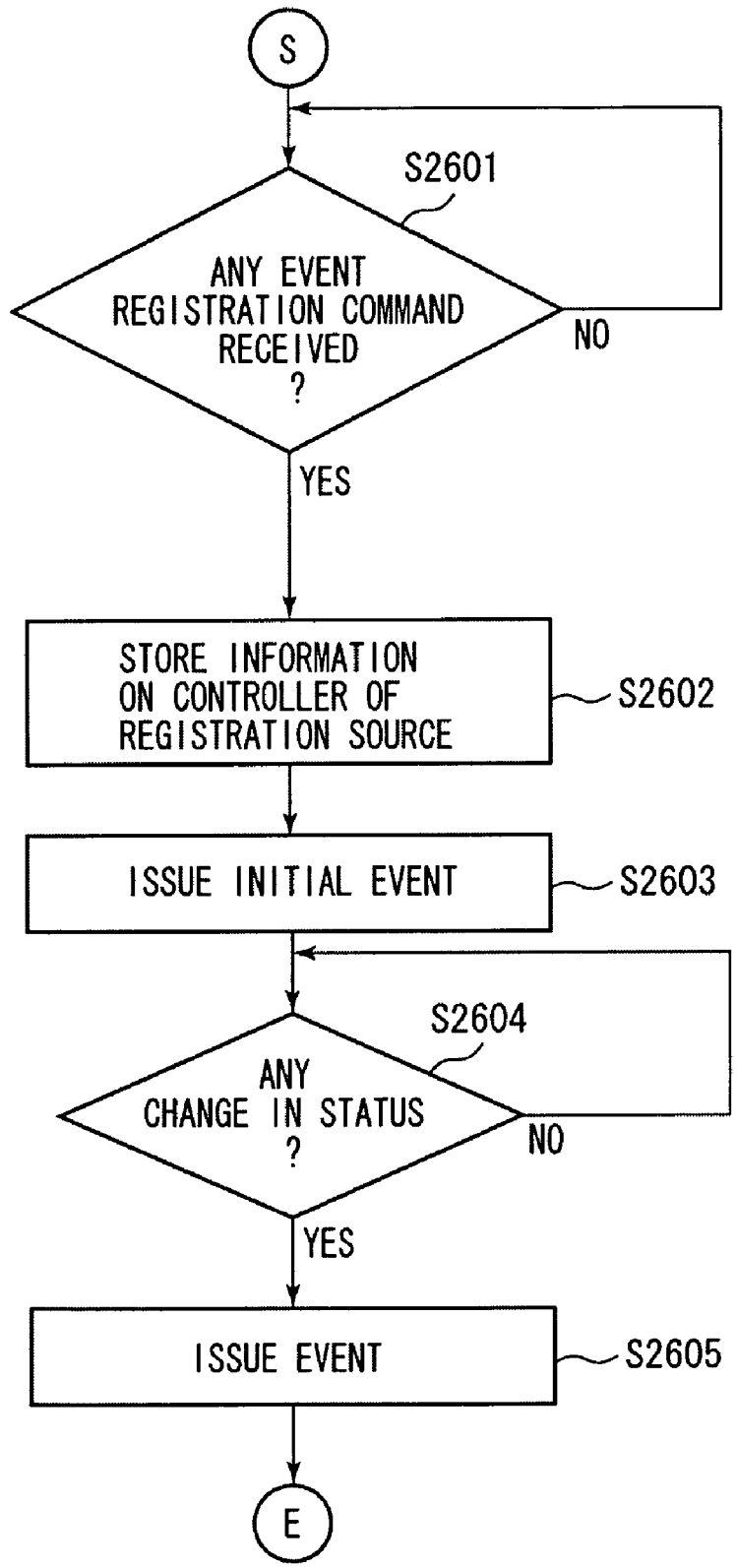
FIG. 26 is a flowchart illustrating an example of an operation of the printer when the event is issued according to an exemplary embodiment of the present invention.

FIG. 26 is a flowchart illustrating an example of an operation of the printer 102 when an event is issued. The printer 102 includes an event processing module which is capable of sending a status of the printer 102 to the DTV 101. The event processing module is based on UPnP eventing specification.

In step S2601, the CPU 311 determines whether an event registration command sent from a print control point (for example the DTV 101) is received. If the CPU 311 determines that the event registration command is received (YES in step S2601), then processing proceeds to step S2602, where the CPU 311 stores information about a controller of a source of registration. If the CPU determined that an event registration command has not been received (NO in step S2601), then step S2601 may be repeated. Next after step S2602, in step S2603, the CPU 311 issues an initial event. The initial event includes a status of the printer 102 at the time of registration.

In step S2604, the CPU 311 monitors the status of the printer 102 and waits until conditions for issuing the event is met or, in other words, event data (status of the printer 102) has changed.

If the event data (status of the printer) has changed (YES in step S2604), then processing advances to step S2605, where the CPU 311 issues an event to the registered print control point. The printer state of the printer 102, which is, for example, "idle", "processing", or "stopped", is defined in the event data. Further, data such as configuration information of the printer 102 is defined in the event data. The configuration information of the printer 102 is, for example, "printer state reasons of the printer 102 that complements the printer state" that describes details of the error state. If the event data has not changed (NO in step S2604), then step S2604 is repeated.

At the time that the CPU 311 issues an event in step S605, in order to manage the event, the CPU 311 acquires printer status information from the printer controller 302 and assigns the printer status information to an element corresponding to the event data. If a change in the value of the element according to the change in the printer status information is discovered, the CPU 311 issues an event including the element in the data.

Figure 27:
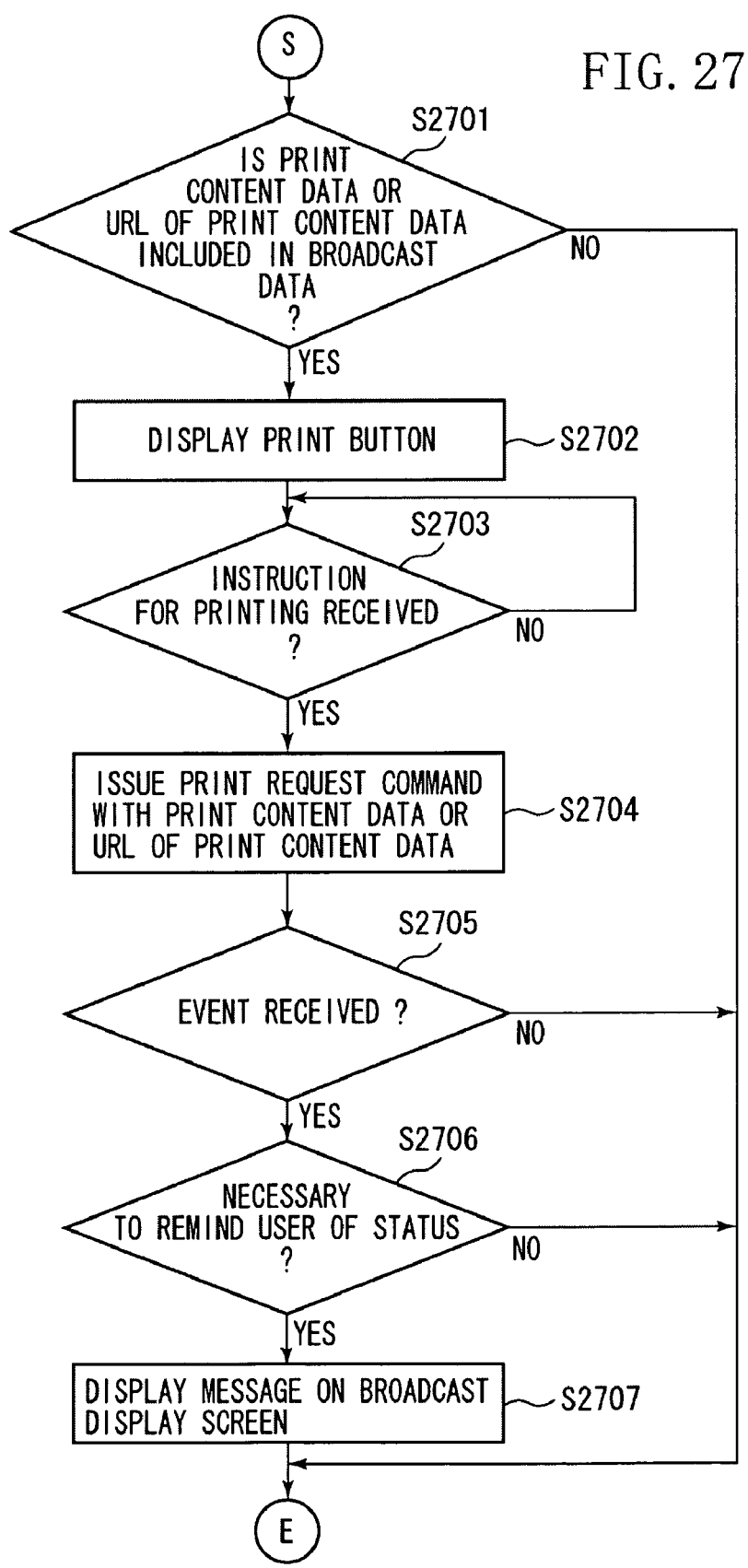
FIG. 27 is a flowchart illustrating an example of an operation of the DTV when the DTV gives instruction for printing according to an exemplary embodiment of the present invention.

In another version, the DTV 101 is capable of obtaining the print content data 110 that is sent using broadcasting, or URL of the print content data 110. FIG. 27 is a flowchart illustrating an example of an operation of the DTV 101 when the DTV 101 gives an instruction for printing. A control program used in communication with the printer 102 as the control point based on UPnP is stored in a control program ROM of the network I/F 212.

In step S2701, the CPU 201 determines whether the print content data 110 or the URL of the print content data 110 is included in the broadcast data. If the print content data 110 or URL of the print content data 110 is not included in the broadcast data (NO in step S2701), then the processing ends.

If the print content data 110 or URL of the print content data 110 is included in the broadcast data (YES in step S2701), then processing advances to step S2702, where the CPU 201 displays a print instruction button on the display screen based on display control script (e.g., broadcast markup language: BML) sent together with the broadcast data. Processing then advances to step S2703, where the CPU 201 waits until the user inputs a print instruction. If the user inputs the print instruction by, for example, remote control operation (YES in step S2703), then the process proceeds to step S2704. If an instruction for printing has not been received (NO in step S2703), then step S2703 may be repeated until such instruction is received.

In step S2704, the CPU 201 issues a print request command (CreateJobV2 or CreateURLJob) based on UPnP print control specification together with the print content data 110 or URL of the print content data 110 to the printer 102 that has been discovered in advance. Before issuing the print request command, the CPU 201 previously registers in the printer 102 a request for event notification of the change in the status of the printer 102 based on UPnP eventing specification. In this way, the DTV 101 can receive an event if a status of the printer 102 is changed.

Next, in step S2705, the CPU 201 determines whether the event has been sent and received from the printer 102. If the event is not received (NO in step S2705), then the process ends. If the event is received (YES in step S2705), then processing advances to step S2706, where the CPU 201 determines whether to remind the user of the status based on printer status information which has been notified according to the event. If the CPU 201 determines not to remind the user (NO in step S2706), then the process ends. If the CPU 201 determines to remind the user (YES in step S2706), then processing advances to step S2707, where the CPU 201 executes overlay display of a message on a broadcast screen of a monitor of the output unit 209 (i.e., displays a message in front of a broadcast present screen).

Figure 28:
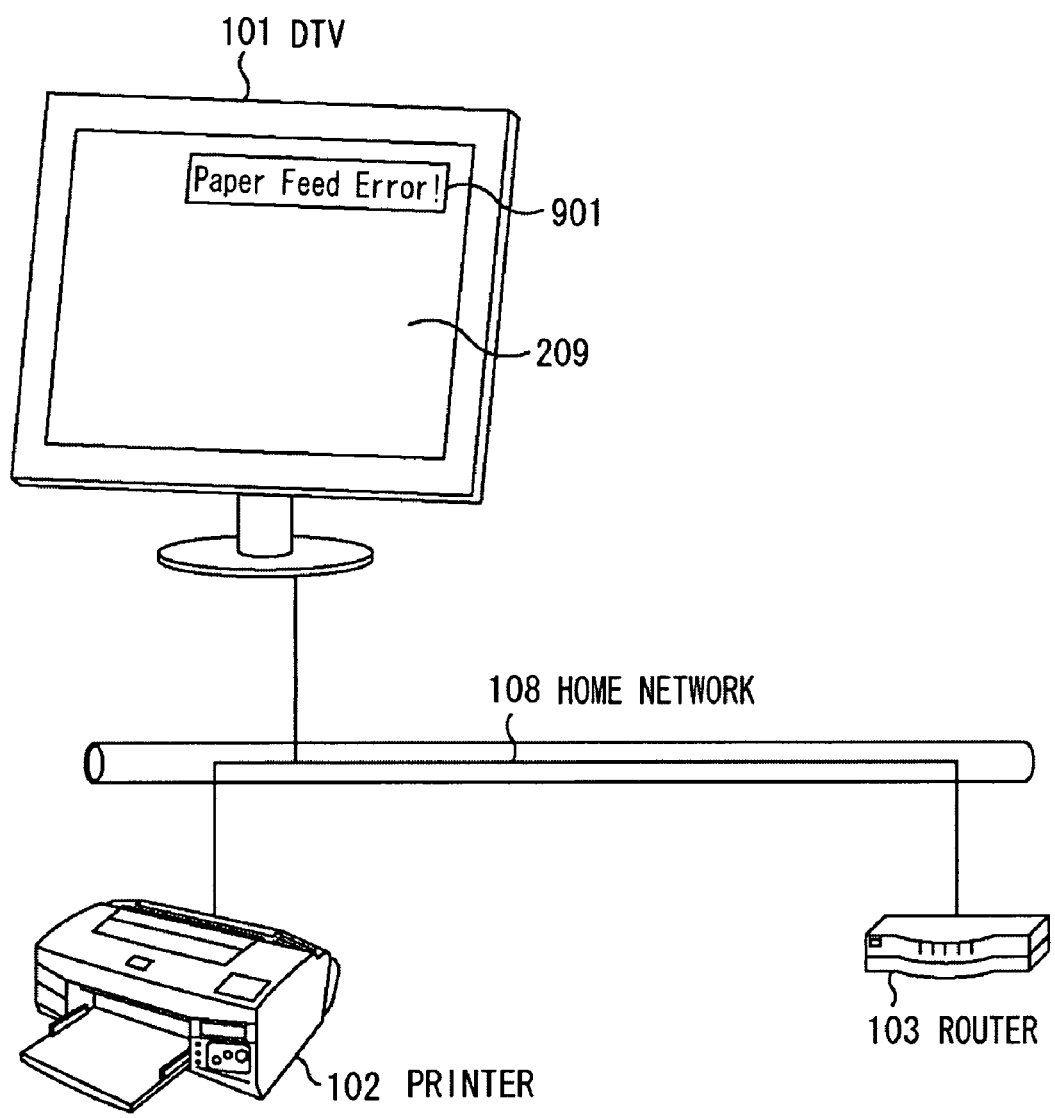
FIG. 28 illustrates an output unit (e.g., display screen of a monitor) of the DTV displaying an example of a notice message according to an exemplary embodiment of the present invention.

FIG. 28 illustrates an output unit 209 (e.g., display screen of the monitor) of the DTV 101 displaying an example of such a notice message that draws the user's attention. If a message 901 is continuously displayed on the screen, it will disturb the view of the user viewing the broadcasting. Thus, according to the present exemplary embodiment, the message 901 is set so as to disappear after a predetermined length of time elapses (for example, after 5 through 10 seconds) if the printer status information included in the event remains unchanged.

Next, in such a configuration, an operation of the printing system according to the present embodiment will be described in a case where a paper feed error occurs in the printer 102 when the printer 102 is printing according to a print request from the DTV 101. In this embodiment, the printer 102, which received the print request from the DTV 101, starts printing after obtaining and rendering actual data of the print content data 110. At that time, the printer state indicated in the printer status information is changed from an idle state to a printing state. According to the change in the printer status information, an event is issued from the printer 102 to the DTV 101.

FIG. 29 illustrates an example of a portion of UPnP event data that may be seen and defined by UPnP printing specification taken from UPnP event data, which is issued when printer status information is changed from the idle state to the printing state. In FIG. 29, the printer status information is given in <PrinterState> 1001 and details of status variable <PrinterStateReasons> 1002. If the state of the printer 102 is changed from the idle state to the printing state, then the <PrinterState> 1001 is changed from "idle" to "processing". On the other hand, the <PrinterStateReasons> 1002 remains as "none".

The DTV 101 that received the event data determines whether to execute overlay display of the message according to the change in the printer status information. If the state of the printer 102 is changed from the idle state to the printing state, the DTV 101 determines that the change in status information is a change within a range of normal operation performed when printing is started, and does not make an overlay display of the message on the output unit 209 (e.g., display screen of monitor) of the DTV 101.

Next, the printer 102 feeds recording paper to be printed. Here, in order to show features of the present exemplary embodiment, an operation of the printing system will be described that is performed in a case where a paper bin of the printer 102 is empty. When the printer 102 executes the feeding operation, since no paper is available, paper feed error occurs.

When the paper feed error occurs as a result of paper feeding by the printer 102, the printer status information (printer state of the printer 102) is changed from the processing state to the error state. According to the change in the printer status information, event data is sent to the DTV 101.

FIG. 30 illustrates an example of the event data when the state of the printer is changed from the printing state to the error state. Since the state of the printer 102 is changed from the printing state to the error state (stopped state) due to no paper, the <PrinterState> 1001 is changed from "processing" to "stopped". Further, the <PrinterStateReasons> 1002 is changed from "none" to "media-empty".

The DTV 101 that has received such event data determines whether to display a message. First, the DTV 101 examines a content of the status information included in the received event data. In the example illustrated in FIG. 30, the DTV 101 determines that a change in status has occurred due to paper feed error. When such an error occurs, the DTV 101 makes an overlay display of a message notifying the user of the error and asking the user to remove the error (in other words, a message asking the user to set print paper) on the screen.

Thus, the DTV 101 that has received the event data from the printer 102 makes an overlay display of the message on the screen as needed. However, as described above, since such a message may disturb the view of the user viewing the broadcasting, the message disappears after a predetermined length of time elapses. For example, the message disappears after a predetermined period of display (T=10 seconds). In such a case, if event data notification including printer status information that is changed due to the occurrence of the paper feed error is issued only once, or a subsequent event data notification is not issued within 10 seconds after the notification of the initial event data, the overlay display of the message will cease to display.

In one embodiment, as described above, according to specifications of UPnP protocol used for communication between the DTV 101 and the printer 102 in the present exemplary embodiment, it is stipulated that event data notification can be issued only when a change in the data that is to be the subject of the notification has occurred, in other words, e.g., when a change in printer status information has occurred. When event data is issued based only on a change in printer status information defined by the standard, the event data will be issued only once when the state of the printer 102 is changed from a normal state (print start) to an error state (paper feed error). Subsequent event data will not be issued unless the error is removed and the status information is changed again.

For example, in one version it may be supposed according to the specifications of the DTV 101, that the time of overlay display of the message that is displayed according to event data is 10 seconds. Then, the user may be unable to notice that a paper feed error has occurred unless the user sees the screen of the DTV 101 within the 10 seconds after the display of the message starts. In such a case, the error state of the printer 102 may remain unnoticed.

Figure 31:
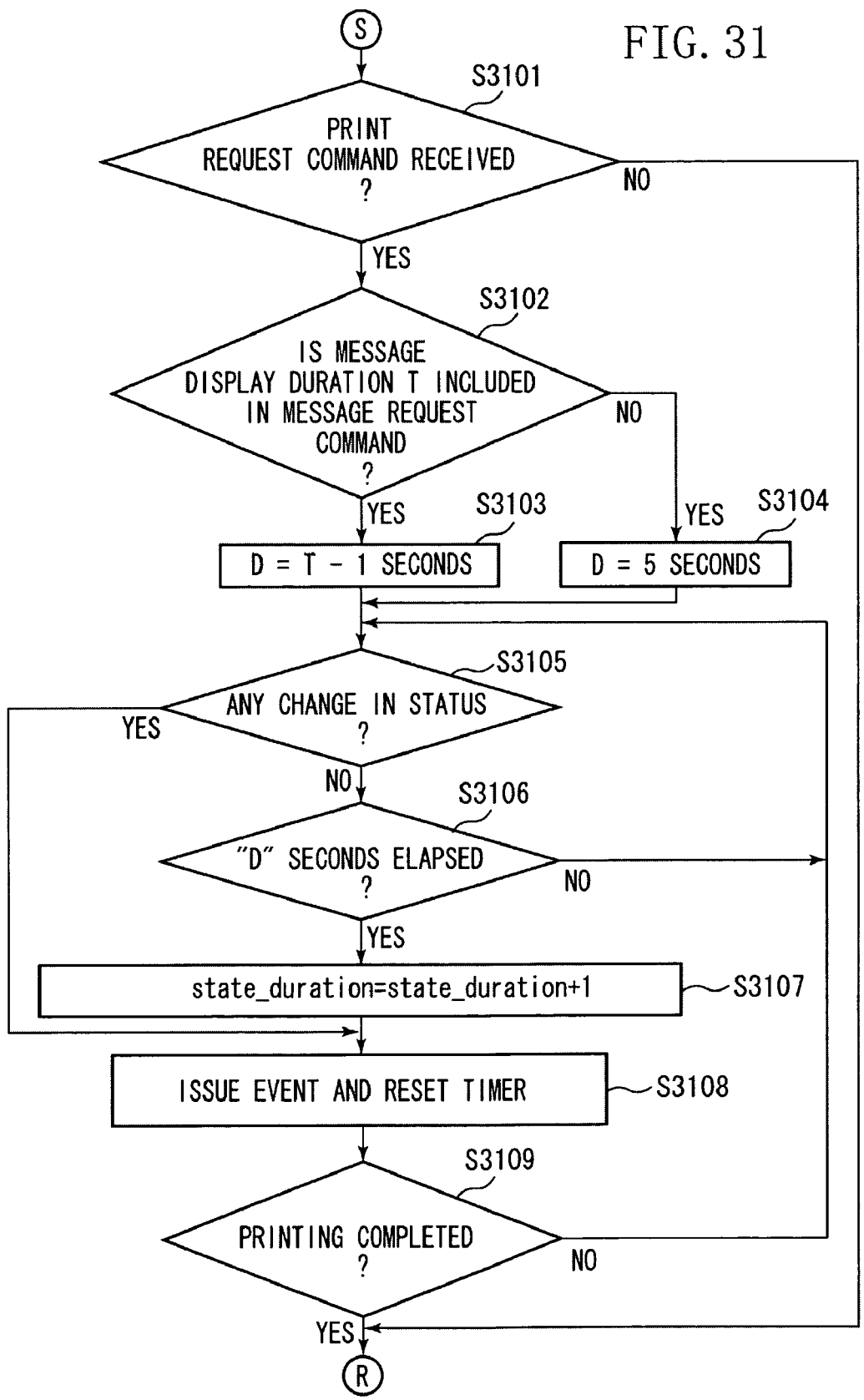
FIG. 31 is a flowchart illustrating an example of an operation of the printer when the event data is issued according to an exemplary embodiment of the present invention.

According to the present exemplary embodiment, such an inconvenience may be solved as described below. FIG. 31 is a flowchart illustrating an example of an operation of the printer 102 when the event data is issued.

In step S3101, the CPU 311 determines whether a print request command (e.g., CreateJobV2) has been sent and received from the DTV 101. If the print request command is not received from the DTV 101 (NO in step S3101), then the process ends. If the print request command is received from the DTV 101 (YES in step S3101), then the process proceeds to step S3102.

A variable "state_duration" (hereinafter referred to as "state_duration variable" as needed), which represents a predetermined status duration time as an increasing value, is defined as an example of state identification information of the printer 102 by the CPU 311. When a status of the printer 102 is changed, the state_duration variable is counted up each time the predetermined period of time elapses if the state continues.

According to the present embodiment, a cycle of the count-up (hereinafter referred to as "count-up cycle") corresponds to a count-up cycle D, which is one second shorter than a message display duration time T of the DTV 101. The DTV 101 can include the message display duration T (for example, 10 seconds) as a variable in the print request command when it issues the command. Thus, the printer 102 can recognize the message display duration time T and obtain the count-up cycle D.

In step S3102, the printer 102 determines whether the message display duration time T is included in the message request command. If the message display duration time T is included in the message request command (YES in step S3102), then the process proceeds to step S3103. In step S3103, the printer 102 subtracts one second from the message display duration time T to calculate the count-up cycle D. Then, the printer 102 starts operating its timer.

If the message display duration time T is not included in the message request command (NO in step S3102), then the process proceeds to step S3104. In step S3104, the printer 102 sets a time (5 seconds in this case), which is set in advance as the count-up cycle D. Then, the printer 102 starts operating its timer.

After the count-up cycle D is thus acquired, in step S3105, the printer 102 determines whether a change in its state has occurred. If the printer 102 determines that the change has occurred (YES in step S3105), then the process proceeds to step S3108.

If the printer 102 determines that the change has not occurred (NO in step S3105), then the process proceeds to step S3106. In step S3106, the printer 102 determines whether time corresponding to one count-up cycle D has elapsed based on the value of the counter. If the time has not elapsed (NO in step S3106), then the process returns to step S3105. Steps S3105 and S3106 are repeated until time corresponding to one count-up cycle D elapses.

If time corresponding to one count-up cycle D has elapsed (YES in step S3106), then the process proceeds to step S3107. In step S3107, the printer 102 adds 1 to the value of the state_duration variable, and the process proceeds to step S3108. In step S3108, the printer 102 issues event data including information based on the state_duration variable added in step S3107, to the DTV 101 and resets the timer.

If the process proceeds from step S3105 to step S3108 due to a change in the state of the printer 102, the printer 102 issues event data including information based on a current state_duration variable to the DTV 101 and resets the timer. Further, if the state of the printer 102 changes from an error state to a normal state, in addition to the above processes, the printer 102 resets the value of the state_duration variable.

In step S3109, the printer 102 determines whether the printing process based on the print request command received in step S3101 is completed. If the printing process is completed (YES in step S3109), then the process ends. If the printing process is not completed (NO in step S3109), then the process returns to step S3105. Steps S3105 through S3109 are repeated until the printing process is completed.

Next, details of the state_duration variable will be described. The state_duration variable is included in a status data structure which is to be notified to the DTV 101 as an event. An element <PrinterStateDuration> is present among the elements included in the status data structure. The value of the state_duration variable is reflected in the <PrinterStateDuration> element. In other words, if a value of the state_duration variable is incremented, the value of the <PrinterStateDuration> element will be incremented together.

According to the example illustrated in FIG. 30, an element 1101 corresponds to the <PrinterStateDuration> element.

Thus, according to the present embodiment, a <PrinterStateDuration> element having a value corresponding to the value of state_duration variable is included in the event data. Since the <PrinterStateDuration> element is included in the event data, if a certain state occurs in the printer 102, in addition to an event that is issued when a change occurs in status information according to the change occurred in the status, an effect described below can be obtained. If the state of the printer 102 is unchanged, since the <PrinterStateDuration> element is changed due to increment of the state_duration variable for each count-up cycle D, the status information will be changed. Accordingly, event data with changing status information will be issued for each count-up cycle D, in other words periodically. According to the present exemplary embodiment, event data is issued if the <PrinterStateDuration> element is changed when the printer 102 is determined to be in the error state.

In one version, if a time period of 10 seconds, which is the message display duration time T according to the present exemplary embodiment, is included in the message request command, event data will be issued as described below. For example, if an error of no paper occurs in the printer 102, then the printer 102 issues event data to the DTV 101 when the state is changed. The state_duration variable is incremented by the printer 102 for each T−1 seconds (i.e., 9 seconds) from the time the event data is issued until the error is removed and the state is changed. Accordingly, the printer 102 issues the event data including an incremented <PrinterStateDuration> value every 9 seconds to the DTV 101.

The DTV 101 determines the printer status information included in the event data each time the DTV 101 receives the event data. For example, if the DTV 101 receives event data that is issued when no paper error has occurred, the DTV 101 makes an overlay display of a predetermined message on the screen. According to the above-described example, the message display duration time T is 10 seconds whereas an issue cycle of the event data is 9 seconds. Accordingly, a request for displaying a next message will be issued by the printer 102 to the DTV 101 before the displayed message disappears. Thus, the message will be continuously displayed while the printer 102 remains in the no paper state.

Figure 32A:
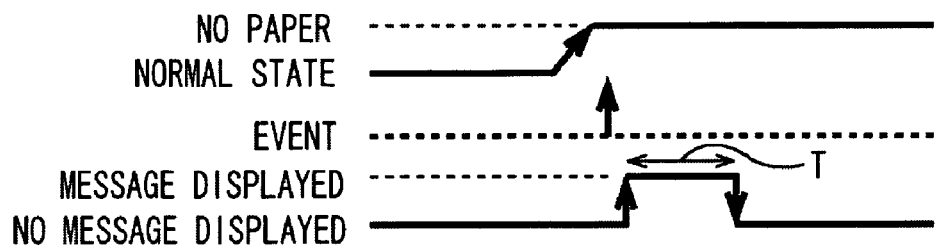
FIGS. 32A and 32B illustrate examples of timing for displaying a message.
Figure 32B:
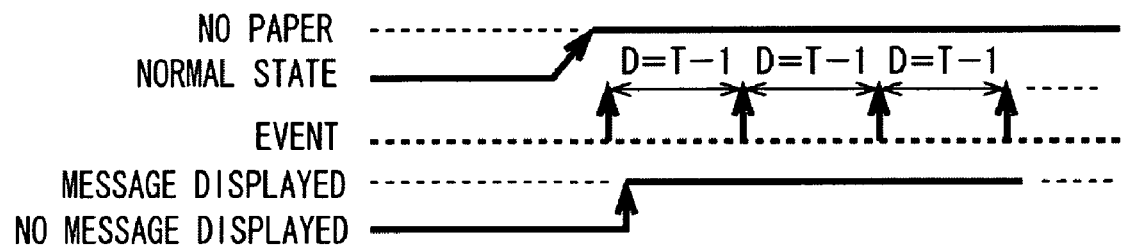

FIGS. 32A and 32B illustrate examples of timing of the display of the message. FIG. 32A illustrates a method for controlling timing of message display without using the state_duration variable according to the present embodiment. FIG. 32B illustrates the method for controlling timing of the message display using the state_duration variable according to the present embodiment.

Since the status remains unchanged until the user notices the error state and recovers the error (e.g., supply of paper), the printer 102 may continually and periodically issue the event data. When the error is recovered by the user and the state of the printer 102 is changed from the error state to the normal state, the printer 102 resets the value of the state_duration variable together with discontinuation of the state. Subsequently, the printer 102 issues event data with the <PrinterState> element set to "processing" and the <PrinterStateReasons> element set to "none" when the state is changed to the normal state.

In one version, the DTV 101 determines the status information included in the event data. When the DTV 101 determines that the <PrinterState> element is changed from "stopped" to "processing", or the printer 102 has returned to the normal state, the DTV 101 stops displaying the message. Consequently, the error message may be continuously displayed from the beginning to the end of the paper feed error in the printer 102.

As described above, the value of the <PrinterStateDuration> element in the event data, which is received while the printer 102 is continuously in the error state, is incremented. By monitoring this value, the DTV 101 is capable of obtaining the duration time of the error state. Thus, the control can be changed according to duration time of the error state. For example, if the printer 102 is continuously in the error state for a long time, it is highly possible that the user is unaware of the error state. Thus, if the DTV 101 determines that duration time of the error state has exceeded a predetermined length of time, or the value of <PrinterStateDuration> has exceeded a predetermined value, the DTV 101 can change the message to one that more strongly draws the attention of the user.

Further, the state continuation variable <PrinterStateDuration> can also be utilized in confirming operation of the printer 102 in the error state. The printer state variable <PrinterState> and the status details variable <PrinterStateReasons>, by which the error state is determined, and which is included in the status information in the event data sent from the printer 102, may be unchanged. In other words, the state represented by the printer state variable <PrinterState> and the status details variable <PrinterStateReasons> may continue to be the same.

In spite of the above situation, if the value of <PrinterStateDuration> does not change, then the event data may not have been issued from the printer 102 or the event data may not have been received by the DTV 101 for some reason. In such a case, the DTV 101 detects whether the printer 102 is operating normally based on <PrinterState>, <PrinterStateReasons>, and <PrinterStateDuration> elements. For example, if the above-described state continues for a predetermined length of time set in advance, the DTV 101 may determine that the printer 102 is not operating normally and execute processing (e.g., displaying a message informing of the error) according to a result of the determination.

Further, it may be the case that the user finds the message disturbing after confirming the message displayed on the DTV 101. Therefore, it may be useful for the user to be capable of forcibly removing the message from the display of the DTV 101 by operating a remote control apparatus, even if the status of the printer 102 is not recovered.

As described above, according to the present exemplary embodiment, the <PrinterStateDuration> element is included in the event data. The <PrinterStateDuration> element is based on the state_duration variable, which indicates that the printer 102 is continuously in the same state. The <PrinterStateDuration> element is a value that changes according to time passage. When the value of the <PrinterStateDuration> element is changed, the printer 102 issues an event data notification to the DTV 101. At this time, the count-up cycle D, which updates the state_duration variable, is set at a cycle shorter than the message display duration time T. In this way, event data can be issued at regular intervals based on the UPnP communication protocols, and a message can be continuously displayed, even in the case where the data processing apparatus is the DTV 101 that is configured to display a message (error) only for a certain period when it receives event data only once.

Each unit that constitutes the communication system and each step used in the device state displaying method according to the above-described exemplary embodiments can be realized by running a program stored in a RAM or a ROM of a computer. The present invention includes such a program and a computer-readable recording medium storing the program.

The above-described exemplary embodiments can be also realized by, for example, a system, an apparatus, a method, a program, or a storage medium. Furthermore, the above-described exemplary embodiments can be realized by a system including a plurality of devices or an apparatus including a single device.

The present invention includes a case where the functions of the above-described exemplary embodiments are realized when a software program stored on a computer-readable storage medium, and having computer-executable instructions (e.g., a program as shown by a flowchart in FIG. 26, FIG. 27 and FIG. 31 according to the present exemplary embodiments) is supplied to a system or an apparatus directly or from a remote location, and a computer of the system or the apparatus executes the instructions in the supplied program code to realize the functions of the above-described exemplary embodiments.

Accordingly, where program code is installed in the computer and executed by the computer to realize functions according to the present invention, the computer readable storage medium having the program code itself may also, in certain aspects, comprise an embodiment according to the present invention. In other words, in one version, the present invention includes a computer-readable storage medium containing computer-executable instructions configured to realize processing of the functions according to the invention, such as those of the above-described exemplary embodiments.

In this case, the computer-executable program can be provided in the form of object code, a program executable by an interpreter, or script data supplied to an operating system, etc., if it functions as a program.

A computer readable recording medium used for supplying the program includes, for example, a floppy disk, a hard disk, an optical disk, a magneto-optical disc (MO), a compact disc read-only memory (CD-ROM), a compact disc—recordable (CD-R), a compact disc—rewritable (CD-RW), a magnetic tape, a non-volatile memory card, a read-only memory (ROM), a digital versatile disc (DVD) (a digital versatile disc read-only memory (DVD-ROM), and a digital versatile disc—recordable (DVD-R)).

The program can also be supplied to a user by connecting to an Internet website using a browser of a client computer and downloading the computer-executable program of the present invention into a recording medium, such as a hard disk. In this case, the program that is downloaded can be a compressed file having an automated install function.

Further, the program code that constitutes the program corresponding to exemplary embodiments of the present invention can be divided into a plurality of files and each file can be downloaded from different Internet websites. In other words, a World Wide Web (WWW) server that allows a plurality of users to download a program file to realize the functions of the exemplary embodiments may also comprise an aspect according to the present invention.

Furthermore, the program according to exemplary embodiments of the present invention can be encrypted, recorded on a storage medium, such as a CD-ROM, and delivered to users. In this case, a user who satisfies a predetermined condition is allowed to download encryption key information from an Internet website via the Internet, to decrypt the encrypted program using the encryption key information, and install the decrypted program on the computer.

In one version, the functions of the above-described exemplary embodiments may be implemented when the provided program is executed by a computer. Additionally or alternatively, the program can be used together with an operating system running on a computer to realize the functions of the above-described exemplary embodiments. In this case, the operating system may perform the whole or only a part of the actual processing.

In one version, a program read out from the recording medium can be stored in a memory equipped in a function expanding board or a function expanding unit connected to a computer. In this case, after the program is stored in the function expanding board or the function expanding unit, based on the instruction of the program, a CPU equipped in the function expanding board or the function expanding unit performs the whole or a part of the actual processing.

While the present invention has been described with reference to exemplary embodiments, it is to be understood that the invention is not limited to only the disclosed exemplary embodiments. Accordingly, the scope of the following claims is to be accorded the broadest interpretation so as to encompass all modifications, equivalent structures, and functions.

This application claims priority from Japanese Patent Application No. 2007-296002 filed Nov. 14, 2007, which is hereby incorporated by reference herein in its entirety.

What is claimed is:

1. A communication system comprising:
a peripheral apparatus; and
a data processing apparatus configured to make a request for processing to the peripheral apparatus,
wherein the peripheral apparatus comprises:
a changing unit configured to change state identification information representing a state of the peripheral apparatus, the state identification information being in a changed state if the peripheral apparatus is continuously in a predetermined state for a certain period and the state identification information being in an unchanged state if the peripheral apparatus is not continuously in the predetermined state for the certain period;
a sending unit configured to send status information to the data processing apparatus, if the state identification information is in the changed state as changed by the changing unit; and
a setting unit configured to set the certain period to be shorter than a predetermined display time based on information concerning the predetermined display time being included in a request from the data processing apparatus;
wherein the data processing apparatus comprises:
a receiving unit configured to receive, from the peripheral apparatus, the status information based on the change of state identification information representing the state of the peripheral apparatus; and
a displaying unit configured to display, if the status information is received by the receiving unit, information about the state of the peripheral apparatus based on the received status information, on a display device, for a predetermined display time,
wherein the certain period is shorter than the predetermined display time.

2. The communication system according to claim 1, wherein the data processing apparatus further comprises a detecting unit configured to detect that the peripheral apparatus has continuously been in the state for a time exceeding a predetermined length of time based on the state identification information included in the status information received by the receiving unit,
  wherein the displaying unit displays information concerning the state of the peripheral apparatus, which is different from information displayed until then, based on the received status information, on the display device, if the state of the peripheral apparatus is detected to be continuing for a time exceeding the predetermined length of time by the detecting unit.

3. An information processing apparatus that communicates with a peripheral apparatus, the information processing apparatus comprising:
  a receiving unit configured to receive status information based on a change of state identification information representing a state of the peripheral apparatus, the state identification information being in a changed state if the peripheral apparatus is continuously in a predetermined state for a certain period and the state identification information in an unchanged state if the peripheral apparatus is not continuously in the predetermined state for the certain period;
  a displaying unit configured to display, if the status information is received by the receiving unit, information about the state of the peripheral apparatus based on the received status information, on a display device, for a predetermined display time; and
  a sending unit configured to send, to the peripheral apparatus, information concerning the predetermined display time so that the certain period is set shorter than the predetermined display time.

4. The information processing apparatus according to claim 3, further comprising a detecting unit configured to detect that the state of the peripheral apparatus has been continuing for a time exceeding a predetermined length of time based on the state identification information included in the status information received by the receiving unit,
  wherein the displaying unit displays information concerning the state of the peripheral apparatus, which is different from information displayed until then, based on the received status information, on the display device, if the state of the peripheral apparatus is detected to be continuing for a time exceeding the predetermined length of time by the detecting unit.

5. A peripheral apparatus configured to receive data from an information processing apparatus and process the received data, the peripheral apparatus comprising:
  a changing unit configured to change state identification information representing a state of the peripheral apparatus, the state identification information being in a changed state if the peripheral apparatus is continuously in a predetermined state for a certain period and the state identification information being in an unchanged state if the peripheral apparatus is not continuously in the predetermined state for the certain period;
  a sending unit configured to send status information to the information processing apparatus, if the state identification information is in the changed state as changed by the changing unit; and
  a setting unit configured to set the certain period to be shorter than a predetermined display time based on information concerning the predetermined display time being included in a request from the data processing apparatus;
  wherein the certain period is shorter than a predetermined display time for a display process of the status information in the information processing apparatus.

6. A method for controlling an information processing apparatus that communicates with a peripheral apparatus, the method comprising:
  receiving status information based on a change of state identification information representing a state of the peripheral apparatus, the state identification information being in a changed state if the peripheral apparatus is continuously in a predetermined state for a certain period and the state information being in an unchanged state if the peripheral apparatus is not continuously in the predetermined state for the certain period;
  displaying information about the state of the peripheral apparatus based on the received status information, on a display device, for a predetermined display time, if the status information is received by the receiving unit; and
  sending, to the peripheral apparatus, information concerning the predetermined display time so that the certain period is set shorter than the predetermined display time.

7. The method according to claim 6, further comprising detecting that the peripheral apparatus has continuously been in the state for a time exceeding a predetermined length of time based on the state identification information included in the status information received by the receiving unit, and
  displaying information concerning the state of the peripheral apparatus, which is different from information displayed until then, based on the received status information, on the display device, if the state of the peripheral apparatus is detected to be continuing for a time exceeding the predetermined length of time.

8. A method for controlling a peripheral apparatus configured to receive data from an information processing apparatus and process the received data, the method comprising:
  changing state identification information representing the state of the peripheral apparatus, the state identification information being in a changed state if the peripheral apparatus is continuously in a predetermined state for a certain period and the state identification information being in an unchanged state if the peripheral apparatus is not continuously in the predetermined state for the certain period;
  sending status information to the data processing apparatus, if the state identification information is in the changed state; and
  setting the certain period to be shorter than a predetermined display time based on information concerning the predetermined display time being included in a request from the data processing apparatus,
  wherein the certain period is shorter than a predetermined display time for a display process of the status information in the information processing apparatus.

9. A non-transitory computer-readable storage medium containing computer-executable instructions for controlling an information processing apparatus that communicates with a peripheral apparatus, the computer-readable storage medium comprising:
  computer-executable instructions for receiving status information based on a change of state identification information representing a state of the peripheral apparatus, the state identification information being in a changed state if the peripheral apparatus is continuously in a predetermined state for a certain period and the state identification information being in an unchanged state if the peripheral apparatus is not continuously in the predetermined state for the certain period;
  computer-executable instructions for displaying information about the state of the peripheral apparatus based on the received status information, on a display device, for a predetermined display time, if the status information is received; and computer-executable instructions for sending, to the peripheral apparatus, information concerning the predetermined display time so that the certain period is set shorter than the predetermined display time.

10. A non-transistory computer-readable storage medium containing computer-executable instructions for controlling a peripheral apparatus configured to receive data from an information processing apparatus and process the received data, the computer-readable storage medium comprising:

computer-executable instructions for changing state identification information representing a state of the peripheral apparatus, the state identification information being in a changed state if the peripheral apparatus is continuously in a predetermined state for a certain period and the state information being in an unchanged state if the peripheral apparatus is not continuously in the predetermined state for the certain period;

computer-executable instructions for sending status information to the data processing apparatus, if the state identification information is in the changed state; and computer-executable instructions for setting the certain period to be shorter than a predetermined display time based on information concerning the predetermined display time being included in a request from the data processing apparatus, wherein the certain period is shorter than a predetermined display time for a display process of the status information in the information processing apparatus.

11. The peripheral apparatus according to claim 5, wherein said predetermined state is an error state.

* * * * *